United States Patent
Ikeda et al.

(10) Patent No.: US 8,941,492 B2
(45) Date of Patent: Jan. 27, 2015

(54) RECEIVING APPARATUS, INFORMATION PROCESSING METHOD AND PROGRAM

(75) Inventors: Tamotsu Ikeda, Tokyo (JP); Ryuichiro Shimura, Kanagawa (JP); Takuya Okamoto, Chiba (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 13/014,083

(22) Filed: Jan. 26, 2011

(65) Prior Publication Data

US 2011/0199207 A1 Aug. 18, 2011

(30) Foreign Application Priority Data

Feb. 17, 2010 (JP) ................................ P2010-032125

(51) Int. Cl.
| | | |
|---|---|---|
| *G08B 21/00* | (2006.01) | |
| *G08B 27/00* | (2006.01) | |
| *G08B 21/10* | (2006.01) | |
| *G08B 25/00* | (2006.01) | |
| *H04L 1/00* | (2006.01) | |

(52) U.S. Cl.
CPC .............. *G08B 27/008* (2013.01); *G08B 21/10* (2013.01); *G08B 25/007* (2013.01); *H04L 1/0045* (2013.01); *H04L 1/0057* (2013.01)
USPC ..................................... 340/540; 340/539.26

(58) Field of Classification Search
USPC ....................................................... 340/540
See application file for complete search history.

(56) References Cited

U.S. PATENT DOCUMENTS

| | | | | |
|---|---|---|---|---|
| 8,537,933 | B2* | 9/2013 | Ikeda et al. | 375/316 |
| 8,599,015 | B2* | 12/2013 | Ikeda et al. | 340/540 |
| 2007/0275682 | A1* | 11/2007 | Adachi | 455/185.1 |
| 2010/0289943 | A1* | 11/2010 | Tokoro et al. | 348/425.2 |

FOREIGN PATENT DOCUMENTS

| | | |
|---|---|---|
| JP | 2009-213105 A | 9/2009 |
| JP | 2009-213105 A5 | 9/2009 |
| JP | 2009-272954 A | 11/2009 |
| JP | 2010-268226 A | 11/2010 |
| JP | 2011-114593 A | 6/2011 |

OTHER PUBLICATIONS

ARIB Tranmission system for Digital Terrestrial Television Broadcasting, Version 1.6, Nov. 30, 2005.*
Japanese Office Action issued Sep. 12, 2013 in Patent Application No. 2010-032125.
U.S. Appl. No. 13/403,239, filed Feb. 23, 2012, Okamoto.
U.S. Appl. No. 13/100,379, filed May 4, 2011, Okamoto, et al.
Chinese Office Action issued Jun. 3, 2014, in China Patent Application No. 201110034227.4 (with English translation).

* cited by examiner

*Primary Examiner* — Kerri McNally
(74) *Attorney, Agent, or Firm* — Oblon, Spivak, McClelland, Maier & Neustadt, L.L.P.

(57) ABSTRACT

An information receiving apparatus that includes a receiver that receives an alert signal including a predetermined number of bits, and a controller that detects that the alert signal includes alert information by processing a subset of the predetermined number of bits of the alert signal, and outputs an indication corresponding to the detection.

12 Claims, 19 Drawing Sheets

RECEIVING APPARATUS, INFORMATION PROCESSING METHOD AND PROGRAM

CROSS-REFERENCE TO RELATION APPLICATIONS

This application is based upon and claims priority under 35 U.S.C. §119 from Japanese Application No. P2010-032125, filed Feb. 17, 2010, the entire contents of which is incorporated herein by reference.

BACKGROUND OF THE INVENTION

1. Field of the Invention

The present invention relates to a receiving apparatus, an information processing method and a program, and more particularly to a receiving apparatus which is adapted to speedily respond to that warning information has been transmitted thereto, an information processing method and a program.

2. Description of the Related Art

An Orthogonal Frequency Division Multiplexing (OFDM) system for modulating each of orthogonal carriers with Phase Shift Keying (PSK) or Quadrature Amplitude Modulation (QAM) by using a large number of orthogonal carriers has been proposed as a modulation system for territorial digital broadcastings.

The OFDM system has the feature that although since the entire transmission band is divided into segments by a large number of sub-carriers, a band per one sub-carrier wave becomes narrow and a transmission rate becomes slow, the total transmission rate is unchanged from that of the existing modulation system.

In addition, the OFDM system has the feature that since a large number of sub-carriers are transmitted in parallel with one another, a symbol speed becomes slow. For this reason, the OFDM system also has the feature that a time length of a multipath relative to a time length of one symbol can be shortened, whereby the OFDM system is hardly influenced by the multipath.

In addition, since data is allocated to a plurality of sub-carriers, the OFDM system has the feature that a transmitting circuit can be configured by using an Inverse Fast Fourier Transform (IFFT) arithmetically operating circuit for carrying out Inverse Fast Fourier Transform in a phase of modulation, and a receiving circuit can be configured by using a Fast Fourier Transform (FFT) arithmetically operating circuit for carrying out Fourier Transform in a phase of demodulation.

From the features described above, the OFDM system is applied to the terrestrial digital broadcasting on which an influence of a multipath interference is strongly exerted in many cases. The standard such as Integrated Services Digital Broadcasting-Terrestrial (ISDB-T), for example, is known as the standard for the terrestrial digital broadcasting adopting the OFDM system.

It is regulated in the ISDB-T standard that in order to transmit either additional information on transmission control for a modulated wave or earthquake motion warning information, an Auxiliary Channel (AC) signal with information of 204 bits as one unit is transferred by using a predetermined sub-carrier in an OFDM symbol. The AC signal is an additional information signal about the broadcasting.

The AC signal is subjected to differential BPSK modulation. The differential BPSK modulation system is a modulation system for differentially coding a data stream to be transmitted, and making information (0, 1) after completion of the differential coding a complex signal (I signal, Q signal) having signal points of (+4/3, 0), and (−4/3, 0).

FIG. 1 is a diagram showing a structure of a frame of the AC signal.

In FIG. 1, numerical value added to corresponding one of under portions of multiple pieces of information represents what number bit corresponding to one of the multiple pieces of information corresponds to with the head of the AC signal as a reference. A transverse length of each of the multiple pieces of information is not proportional to the number of bits.

As shown in an upper stage of FIG. 1, the AC signal with the information of 204 bits as one unit is composed of a reference signal of 1 bit for differential modulation, structure identification of 3 bits, and additional information of 200 bits on transmission control for a modulated wave or earthquake motion warning information in the order from the head.

The reference signal is a signal coming to have a reference amplitude and a reference phase for the differential demodulation.

The structure identification is a signal for identifying a structure of the AC signal. 000, 010, 011, 100, 101 or 111 of the structure identification represents that the additional information on the transmission control for the modulated wave is transmitted. Also, 001 or 110 of the structure identification represents that the earthquake motion warning information is transmitted. When the structure identification is either 001 or 110, the earthquake motion warning information is transmitted with the following 200 bits.

It is noted that the earthquake motion warning information is transmitted by using the AC carrier of a segment of No. 0. The entire frequency band used in the digital broadcasting complying with the ISDB-T standard is divided into 13 segments from No. 0 to No. 12. Also, the carrier (AC carrier) which is transmitted by using the AC signal is regulated every segment.

The earthquake motion warning information of 200 bits is composed of a synchronous signal of 13 bits, a start/end flag of 2 bits, an update flag of 2 bits, signal identification of 3 bits, earthquake motion warning detailed information of 88 bits, Cyclic Redundancy Check (CRC) of 10 bits, and parity bits of 82 bits.

The synchronous signal is information representing a head position of the earthquake motion warning information. Specifically, W0="1010111101110" when the structure identification is 001, and W1="0101000010001" as an inverted word of W0 when the structure identification is 110 are alternately inserted in frames.

The start/end flag is 00 "when the earthquake motion warning detailed information is present," and is 11 "when the earthquake motion warning detailed information is absent."

The update flag is increased one-by-one basis whenever a change is caused in the contents of a series of earthquake motion warning detailed information which is transmitted when the start/end flag is 00, and informs a receiver of that the signal identification or the earthquake motion information has been updated.

The signal identification is a signal which is used to identify a kind of earthquake motion warning detailed information following the signal identification.

000 of the signal identification represents that "an appropriate area of the earthquake motion warning detailed information is present," and 001 of the signal identification represents that "an appropriate area of the earthquake motion warning detailed information is absent." The wording "an appropriate area of the earthquake motion warning detailed information is present" means that an objective area of the earthquake motion warning detailed information is present in a broadcasting area. Also, the wording "an appropriate area of the earthquake motion warning detailed information is absent" means that the objective area of the earthquake motion warning detailed information is absent in the broadcasting area.

In addition, 010 of the signal identification represents that "a test signal of the earthquake motion warning detailed information is present in an appropriate area," and 011 of the signal identification represents that "a test signal of the earthquake motion warning detailed information is absent in the appropriate area." 111 represents "the earthquake motion warning detailed information is absent (identification of broadcasters)." Each of 100, 101 and 110 of the signal identification is undefined. When the signal identification is any one of 000, 001, 010, and 011, information of current time information which sends the earthquake motion warning information, information representing the objective area of the earthquake motion warning, and information on an earthquake center of the earthquake motion warning are transmitted as the earthquake motion warning detailed information.

In addition, when the signal identification is 111, the identification of the broadcasters is transmitted as the earthquake motion warning detailed information. Also, when the signal identification is any one of 100, 101 and 110, ALL1 is transmitted as the earthquake motion warning detailed information.

CRC is a CRC code which is generated in accordance with a generating polynomial with respect to bits from 22nd bit to 112nd bit with the head of the AC signal as a reference.

The parity bit is an error correction code which is generated from a shortened code (187, 107) of a difference set cycle code (273, 191) with respect to the bits from 18th bit to 122nd bit with the head of the AC signal as a reference.

The technique described above, for example, is disclosed in a non-patent document of STD-B31<http://www.arib.or.jp/english/html/overview/doc/2-STD-B31v1_8.pdf>.

SUMMARY

FIG. 2 is a block diagram showing an example of a configuration of an earthquake motion warning information decoding circuit.

The earthquake motion warning information decoding circuit is composed of a differentially demodulating circuit 51, a bit determining circuit 52, a difference set cycle code decoding circuit 53, and a CRC circuit 54.

For example, it is supposed that the earthquake motion information which is transmitted with the AC signal is decoded in the earthquake motion warning information decoding circuit having such a configuration. The earthquake motion warning information decoding circuit is provided within a receiving portion mounted to a receiving apparatus such as a television receiver or a recording apparatus.

The receiving portion is provided with a tuner, a band pass filter, an A/D conversion circuit, a digital orthogonal demodulating circuit, an FFT arithmetically operating circuit, a carrier demodulating circuit, an error correcting circuit, and the like in addition to the earthquake motion warning information decoding circuit. The details of both the receiving apparatus and the receiving portion will be described later.

After the OFDM signal demodulated by the digital orthogonal demodulating circuit within the receiving portion is subjected to FFT in an FFT arithmetically operating circuit, the resulting OFDM signal is inputted to the earthquake motion warning information decoding circuit. The signal inputted to the earthquake motion warning information decoding circuit is a complex signal consisting of a real axis component (I signal) and an imaginary axis component (Q signal).

The differential demodulating circuit 51 differentially demodulates the AC signal inputted as the complex signal to the earthquake motion warning information decoding circuit, thereby generating a complex signal having a signal point corresponding to the original information bits. The signal differentially demodulated by the differential demodulating circuit 51 is supplied to the bit determining circuit 52.

The bit determining circuit 52 carries out the bit determination in accordance with the signal thus differentially demodulated. That is to say, the bit determining circuit 52 determines whether the value modulated is either a bit value of "0" or a bit value of "1" from the signal point, on an IQ plane, of the signal thus differentially demodulated, and outputs one of the bit values "0" and "1." Thus, the AC signal coming to have a form of a bit stream is outputted from the bit determining circuit 52. The AC signal outputted from the bit determining circuit 52 is supplied to the difference set cycle code decoding circuit 53.

The difference set cycle code decoding circuit 53 detects a head of a frame of the AC signal synchronously with a frame synchronous signal supplied thereto from a synchronization/frame detecting circuit (not shown). After the difference set cycle code decoding circuit 53 are received up to 204th bit as the final bit composing the AC signal, the difference set cycle code decoding circuit 53 carries out the error correction by using a difference set cycle code contained as parity bits of 82 bits in the earthquake motion warning information. The difference set cycle code decoding circuit 53 outputs the earthquake motion warning information subjected to the error correction to the CRC circuit 54.

In addition, the difference set cycle code decoding circuit 53 outputs an error correction success/failure signal representing either success or failure in the error correction. The error correction success/failure signal represents "OK" when the error correction succeeds, and represents "NG" when the error correction fails.

The CRC circuit 54 carries out CRC by using a CRC code of 10 bits contained in the earthquake motion warning information, thereby outputting a CRC success/failure signal representing success or failure in the CRC, and the earthquake motion warning information. The CRC success/failure signal represents "OK" when success is made in the CRC, and represents "NG" when failure is made in the CRC.

It is noted that the earthquake motion warning information outputted from the CRC circuit 54 is partial information such as a start/end flag, an update flag, the signal identification, and the earthquake motion warning detailed information of either all the information contained in the earthquake motion warning information, or the information contained in the earthquake motion warning information.

The error correction success/failure signal outputted from the difference set cycle code decoding circuit 53, and the CRC success/failure signal and the earthquake motion warning information both outputted from the CRC circuit 54 are all written to an Inter-Integrated Circuit (I2C) within the receiving portion. A controller which has read out the earthquake motion warning information from a register of the receiving portion executes processing for informing a user of information on the earthquake by either displaying an image or outputting a sound.

When the earthquake was generated and the earthquake motion warning information has been transmitted, preferably, the user is informed of the contents of the earthquake motion warning information before reaching of the earthquake.

For this reason, it is necessary that the earthquake motion warning information decoding circuit in the receiving portion informs that the controller of the earthquake motion warning information has been transmitted thereto as quickly as possible, and also transmits the earthquake motion warning information itself to the controller.

In the earthquake motion warning information decoding circuit shown in FIG. 2, it is determined whether or not the earthquake motion warning information has been transmitted after synchronization for the AC signal in accordance with the structure identification of 3 bits. In addition, when it is determined that the earthquake motion warning information has been transmitted, 204th bit from the head of the AC signal is received, and the error correction and CRC are then carried out by using the difference set cycle code and the CRC code, respectively. After that, the earthquake motion warning information is outputted to the controller.

Thereafter, with such a system, it may be impossible to transmit the earthquake motion warning information to the controller unless all 204 bits of the AC signal are received. It is delayed to inform the user of the contents of the earthquake motion warning information with this situation as the cause in some cases. When the controller activates a device such as a display device or a speaker used to inform the user of the contents of the earthquake motion warning information after the earthquake motion warning information has been transmitted to the controller, it takes time to activate such a device, and thus it is delayed to inform the user of the contents of the earthquake motion warning information.

The present invention has been made in order to solve the problems described above, and it is therefore desirable to provide a receiving apparatus which can be adapted to speedily respond to that warning information has been transmitted, an information processing method, and a program.

According to one exemplary embodiment, the invention is directed to an information receiving apparatus comprising: a receiver configured to receive an alert signal comprising a predetermined number of bits; and a controller configured to detect that the alert signal includes alert information by processing a subset of the predetermined number of bits of the alert signal, and output an indication corresponding to the detection.

The alert signal may comprise 204 bits.

The controller may be configured to detect that the alert signal includes alert information by processing a 3 bit structure identification field of the alert signal.

The controller may be configured to detect that the alert signal includes alert information by processing a 3 bit structure identification field of the alert signal, a 13 bit synchronization field of the alert signal and at least a first bit of a 2 bit start/ending flag field of the alert signal.

The controller may be configured to detect that the alert signal includes alert information by processing a 3 bit structure identification field of the alert signal, a 13 bit synchronization field of the alert signal, a 2 bit start/ending flag field of the alert signal, a 2 bit update flag field of the alert signal, and a 3 bit signal identification field of the alert signal.

The controller may be configured to process all of the predetermined number of bits of the alert signal, and output data corresponding to an emergency event based on the processing.

The alert signal may comprise redundant information, and the redundant information may comprise a plurality of cyclic redundancy check (CRC) bits and a plurality of parity bits. The alert signal may also comprise warning information, and the warning information is provided in the alert signal before the redundant information.

The alert signal may be an Integrated Services Digital Broadcasting-Terrestrial (ISDB-T) compliant signal.

The information receiving apparatus may further include an early detection flag generating circuit configured to generate an early detection flag and write the early detection flag to a register when it is determined that the alert signal includes alert information.

The controller may be configured to process all of the predetermined number of bits of the alert signal after the early detection flag is written to the register by the early detection flag generating circuit.

According to another exemplary embodiment, the invention is directed to a method of processing an alert signal by a receiving apparatus, the method comprising: receiving, by a receiver of the receiving apparatus, a subset of an alert signal, the alert signal comprising a predetermined number of bits; detecting, by a controller of the receiving apparatus, that the alert signal includes alert information by processing the received subset of the alert signal; and outputting, by the controller of the receiving apparatus, an indication corresponding to the detection.

The alert signal may comprise 204 bits.

The detecting may include detecting that the alert signal includes alert information by processing a 3 bit structure identification field of the alert signal.

The detecting may include detecting that the alert signal includes alert information by processing a 3 bit structure identification field of the alert signal, a 13 bit synchronization field of the alert signal, and at least a first bit of a 2 bit start/ending flag field of the alert signal.

The detecting may include detecting that the alert signal includes alert information by processing a 3 bit structure identification field of the alert signal, a 13 bit synchronization field of the alert signal, a 2 bit start/ending flag field of the alert signal, a 2 bit update flag field of the alert signal, and a 3 bit signal identification field of the alert signal.

The method may further comprise processing all of the predetermined number of bits of the alert signal; and outputting data corresponding to an emergency event based on the processing.

The alert signal may comprise redundant information, and the redundant information may include a plurality of cyclic redundancy check (CRC) bits and a plurality of parity bits.

The alert signal may comprise warning information, which may be provided in the alert signal before the redundant information.

The alert signal may be a Integrated Services Digital Broadcasting-Terrestrial (ISDB-T) compliant signal.

The method may further comprise generating an early detection flag and writing the early detection flag to a register when it is determined that the alert signal includes alert information.

The method may further comprise processing all of the predetermined number of bits of the alert signal after the early detection flag is written to the register.

According to another exemplary embodiment, the invention is directed to a non-transitory computer-readable medium including a computer program, which when executed by a receiving apparatus, causes the receiving apparatus to perform a method of processing an alert signal, the method comprising: receiving a subset of an alert signal, the alert signal comprising a predetermined number of bits; detecting that the alert signal includes alert information by processing the received subset of the alert signal; and outputting an indication corresponding to the detection.

The alert signal may comprise 204 bits.

The detecting may include detecting that the alert signal includes alert information by processing a 3 bit structure identification field of the alert signal.

The detecting may include detecting that the alert signal includes alert information by processing a 3 bit structure identification field of the alert signal, a 13 bit synchronization field of the alert signal, and at least a first bit of a 2 bit start/ending flag field of the alert signal.

The detecting may include detecting that the alert signal includes alert information by processing a 3 bit structure identification field of the alert signal, a 13 bit synchronization field of the alert signal, a 2 bit start/ending flag field of the alert signal, a 2 bit update flag field of the alert signal, and a 3 bit signal identification field of the alert signal.

The method may further comprise processing all of the predetermined number of bits of the alert signal; and outputting data corresponding to an emergency event based on the processing.

The alert signal may comprise redundant information, and the redundant information may include a plurality of cyclic redundancy check (CRC) bits and a plurality of parity bits.

The alert signal may comprise warning information, which may be provided in the alert signal before the redundant information.

The alert signal may be a Integrated Services Digital Broadcasting-Terrestrial (ISDB-T) compliant signal.

The method may further comprise generating an early detection flag and writing the early detection flag to a register when it is determined that the alert signal includes alert information.

The method may further comprise processing all of the predetermined number of bits of the alert signal after the early detection flag is written to the register.

According to the present invention, it is possible to speedily respond to that the warning has been transmitted.

DETAILED DESCRIPTION OF THE PREFERRED EMBODIMENTS

The preferred embodiments of the present invention will be described in detail hereinafter with reference to the accompanying drawings.

<First Embodiment>
[Configuration of Receiving Apparatus]

Figure 3:
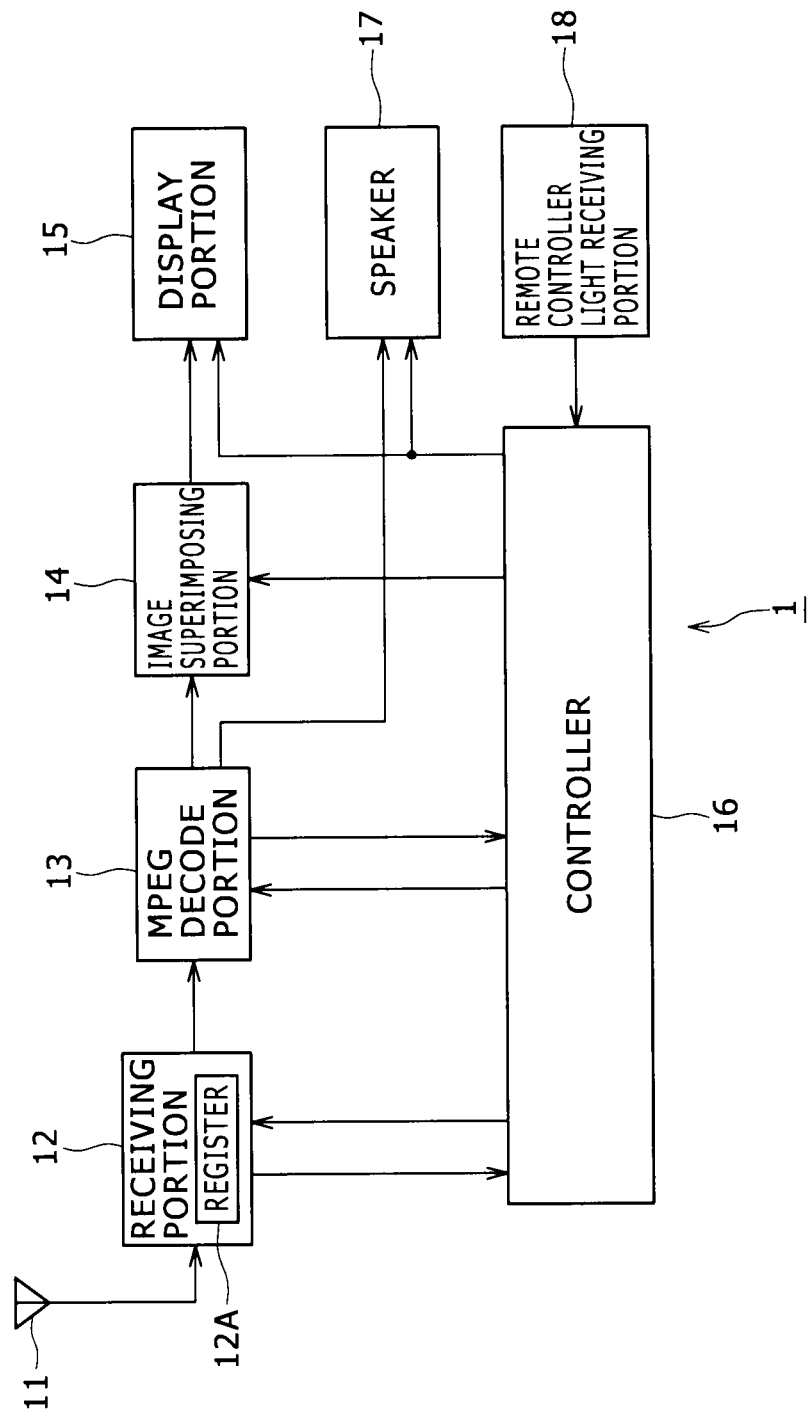
FIG. 3 is a block diagram showing a configuration of a receiving apparatus according to a first embodiment of the present invention.

FIG. 3 is a block diagram showing a configuration of a receiving apparatus according to an embodiment mode of the present invention.

The receiving apparatus 1 is an apparatus, such as a television receiver or a recording apparatus, which can receive a digital broadcasting, for example, complying with the ISDB-T standard. A broadcasting wave which has been transmitted from a broadcasting station is received at an antenna 11, and a received signal is supplied to a receiving portion 12.

The receiving portion 12 tunes a predetermined transmission channel, and executes demodulating processing, thereby taking out a digital signal composed of "0" and "1." In addition, the receiving portion 12 carries out error correction for the demodulated signal, thereby acquiring a TS packet transmitted from the broadcasting station. Data on an image, a sound and the like is contained in the TS packet thus acquired. The TS packet storing therein the data on the image, the sound and the like is supplied to an MPEG decode portion 13.

In addition, when earthquake motion warning information has been transmitted to the receiving portion 12 by using an AC signal, the receiving portion 12 decodes the earthquake motion warning information, thereby outputting resulting information to a controller 16. For example, the earthquake motion warning information written to a register 12A composed of an I2C is read out to the controller 16, thereby supplying the earthquake motion warning information.

Before the entire AC signal is received and the earthquake motion warning information is outputted, the receiving portion 12 determines whether or not the earthquake motion warning information has been transmitted thereto in accordance with received partial information of the entire AC signal. When it is determined that the earthquake motion warning information has been transmitted thereto, the receiving portion 12 generates an early detection flag as a flag representing that the earthquake motion warning information has been transmitted thereto, and outputs the early detection flag thus generated to the controller 16. The early detection flag is also written to the register 12A, and is read out by the controller 16 similarly to the case of the earthquake motion warning information.

The MPEG decode portion 13 decodes the TS packet supplied thereto from the receiving portion 12, thereby extracting both video data and audio data from the TS packet, and outputs the video data and the audio data to an image superimposing portion 14 and an audio processing circuit (not shown), respectively. In the audio processing circuit, predetermined processing is executed for the audio data, and a sound is outputted from a speaker 17 in time for display of an image.

The image superimposing portion 14 superimposes the image the data on which is supplied thereto from the MPEG decode portion 13, and the information supplied thereto from the controller 16 on each other, and outputs the data on the image on which the information on the earthquake is superimposed to a display portion 15. When the information on the earthquake is not supplied thereto from the controller 16, the image superimposing portion 14 outputs the video data supplied thereto from the MPEG decode portion 13 to the display portion 15 as it is.

The display portion 15 is a display device such as a Liquid Crystal Display (LCD) device or a Plasma Display Panel (PDP) device. The display portion 15 displays thereon various kinds of images such as the image on which the information on the earthquake is superimposed in accordance with the data supplied thereto from the image superimposing portion 14.

The controller 16 controls the entire operation of the receiving apparatus 1 in accordance with the information supplied thereto from a remote controller light receiving portion 18.

For example, when the earthquake motion warning information is read out from the register 12A of the receiving portion 12, the controller 16 outputs the information on the earthquake to the image superimposing portion 14 in accordance with the contents of the earthquake motion warning information. Also, the image superimposing portion 14 superimposes the information on the earthquake on the image, and the display portion 15 displays thereon the resulting image. In addition, when the information on the earthquake is not displayed on a screen of the display portion 15, but is outputted as the sound to be noticed to the user, the controller 16 outputs the audio data for the notice of the information on the earthquake to the user to the speaker 17, thereby causing the speaker 17 to output a warning sound or a voice.

In addition, when the receiving apparatus 1 is in a stand-by state in the case where the early detection flag is read out from the register 12A before the earthquake motion warning information, the controller 16 activates the display portion 15 or the speaker 17. The activation for the display portion 15 or the speaker 17 is carried out as a preparation for allowing the user to be speedily informed of the information on the earthquake when, thereafter, the earthquake motion warning information has been received.

The speaker 17 outputs the sound such as the warning sound for the notice of the information on the earthquake to the user in accordance with the audio data supplied thereto from the controller 16.

The remote controller light receiving portion 18 receives the signal transmitted thereto from a remote controller (not shown), and outputs information representing the contents of a manipulation made by the user to the controller 16.

Figure 4:
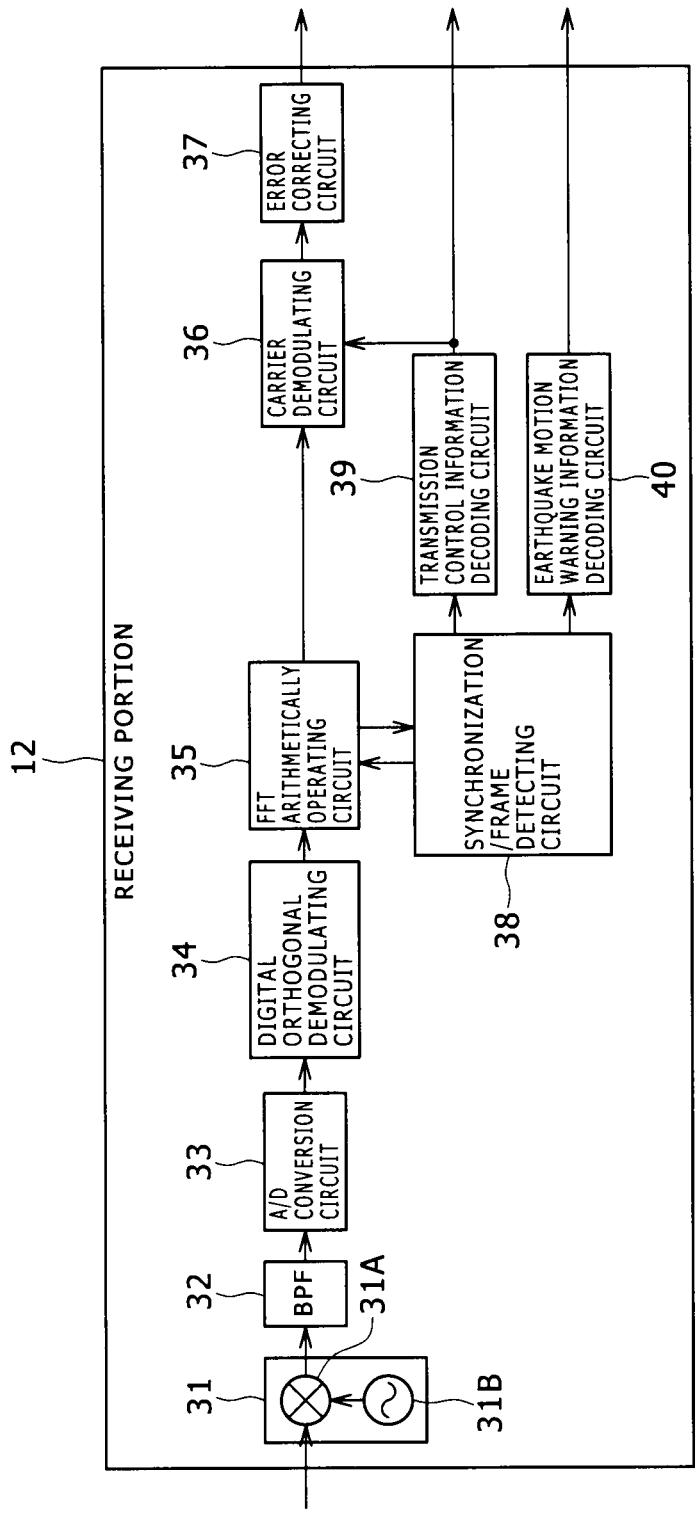
FIG. 4 is a block diagram showing a configuration of a receiving portion of the receiving apparatus shown in FIG. 3.

FIG. 4 is a block diagram showing a configuration of the receiving portion 12 shown in FIG. 3.

The receiving portion 12 is composed of a tuner 31, a Band Pass Filter (BPS) 32, an A/D conversion circuit 33, a digital orthogonal demodulating circuit 34, an FFT arithmetically operating circuit 35, a carrier demodulating circuit 36, an error correcting circuit 37, a synchronization/frame detecting circuit 38, a transmission control information decoding circuit 39, and an earthquake motion warning information decoding circuit 40. The received signal as the OFDM signal outputted from the antenna 11 is supplied to the tuner 31.

The tuner 31 is composed of a multiplying circuit 31A and a local oscillator 31B. The tuner 31 subjects the RF signal supplied thereto from the antenna 11 to frequency conversion to generate an IF signal. The IF signal thus generated is supplied to the BPS 32.

The BPF 32 subjects the IF signal to filtering processing, and outputs the resulting signal to the A/D conversion circuit 33.

The A/D conversion circuit 33 subjects the IF signal to the A/D conversion to digitize the IF signal, and outputs the resulting digital signal to the digital orthogonal demodulating circuit 34.

The digital orthogonal demodulating circuit 34 subjects the IF signal thus digitized to orthogonal demodulation by using a carrier signal having a predetermined frequency (carrier frequency), and the OFDM signal in a base band to the FFT arithmetically operating circuit 35. The base band signal outputted from the digital orthogonal demodulating circuit 34 is subjected to the orthogonal demodulation, and as a result, turns into a complex signal containing a real axis component and an imaginary axis component.

The FFT arithmetically operating circuit 35 extracts a signal for an effective symbol length from a signal of one OFDM symbol, and carries out an FFT arithmetic operation for the signal thus extracted. That is to say, the FFT arithmetically operating circuit 35 removes a signal for a guard interval length from one OFDM symbol, and carries out the FFT arithmetic operation for the remaining signal.

The signal which is extracted by carrying out the FFT arithmetic operation in the FFT arithmetically operating circuit 35, and is modulated into the sub-carriers is the complex signal consisting of the real axis component and the imaginary axis component. The signal extracted by the FFT arithmetically operating circuit 35 is supplied to each of the carrier demodulating circuit 36 and the synchronization/frame detecting circuit 38.

The carrier demodulating circuit 36 subjects the signal which is outputted from the FFT arithmetically operating circuit 35 and is demodulated from the sub-carriers to the carrier demodulation. Specifically, the carrier demodulating circuit 36 executes differential demodulation processing for a differential modulation signal (DQPSK signal) and equalization processing for a synchronous modulation signal (QPSK, 16QAM, 64QAM signal), and output a signal obtained through both the differential modulation processing and the equalization processing to the error correcting circuit 37.

The error correcting circuit 37 subjects the signal which is being interleaved on the transmission side to deinterleaving processing, and subjects that signal to processing such as depuncture, Viterbi decoding, diffusion signal removal and RS decoding, thereby outputting the decoded data. The decoded data outputted from the error correcting circuit 37 is supplied to the MPEG decode portion 13.

The synchronization/frame detecting circuit 38 executes various kinds of synchronous processing in accordance with the OFDM signal in the base band supplied from the digital orthogonal demodulating circuit 34 to the FFT arithmetically operating circuit 35, and the signal demodulated from the sub-carriers by the FFT arithmetically operating circuit 35. For example, the synchronization/frame detecting circuit 38 detects a boundary of the OFDM symbol by executing the synchronous processing, and outputs information specifying a range of the FFT and its timing to the FFT arithmetically operating circuit 35.

In addition, the synchronization/frame detecting circuit 38 extracts a TMCC signal as transmission control information from the predetermined sub-carrier of the signal demodulated by the FFT arithmetically operating circuit 35, and detects the synchronous signal for the TMCC signal, thereby detecting the boundary of the OFDM frame. The synchronization/frame detecting circuit 38 outputs a frame synchronous signal representing the boundary position of the OFDM frame detected together with the TMCC signal to the transmission control information decoding circuit 39.

The synchronization/frame detecting circuit 38 extracts an AC signal from the predetermined sub-carrier of the signal demodulated by the FFT arithmetically operating circuit 35, and detects a synchronous signal for the AC signal, thereby detecting the boundary of the OFDM frame. The synchronization/frame detecting circuit 38 outputs a frame synchronous signal representing the boundary position of the OFDM frame detected together with the AC signal to the earthquake motion warning information decoding circuit 40.

The transmission control information decoding circuit 39 subjects TMCC information contained in the TMCC signal for which the synchronization is ensured to the error correction by using a difference set cycle code. In addition, the transmission control information decoding circuit 39 outputs the TMCC information subjected to the error correction to the carrier demodulating circuit 36, and controls the processing in the carrier demodulating circuit 36.

The earthquake motion warning information decoding circuit 40 subjects the earthquake motion warning information contained in the AC signal for which the synchronization is ensured to the error correction by using the difference set cycle code, and carries out the CRC for the earthquake motion warning information by using the CRC code. The earthquake motion warning information decoding circuit 40 outputs the earthquake motion warning information which has been subjected to both the error correction and the CRC.

When it is detected based on the received partial information of the AC signal that the earthquake motion warning information has been transmitted before the earthquake motion warning information is outputted, the earthquake motion warning information decoding circuit 40 generates the early detection flag, and output the early detection flag thus generated. Both the earthquake motion warning information and the early detection flag which have been outputted from the earthquake motion warning information decoding circuit 40 are written to the register 12A (not shown in FIG. 4).

Figure 5:
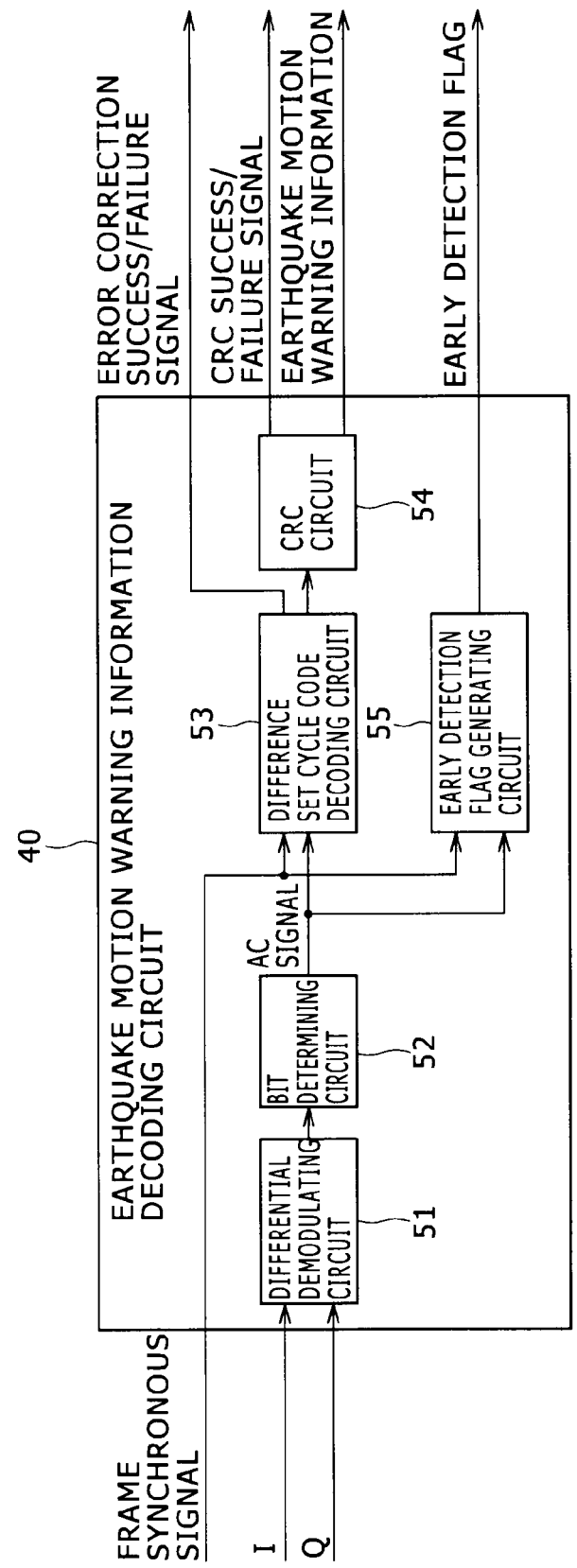
FIG. 5 is a block diagram showing an example of a configuration of an earthquake motion warning information decoding circuit in a receiving portion in a receiving apparatus according to the first embodiment of the present invention.

FIG. 5 is a block diagram showing an example of a configuration of the earthquake motion warning information decoding circuit 40 shown in FIG. 4.

Figure 2:
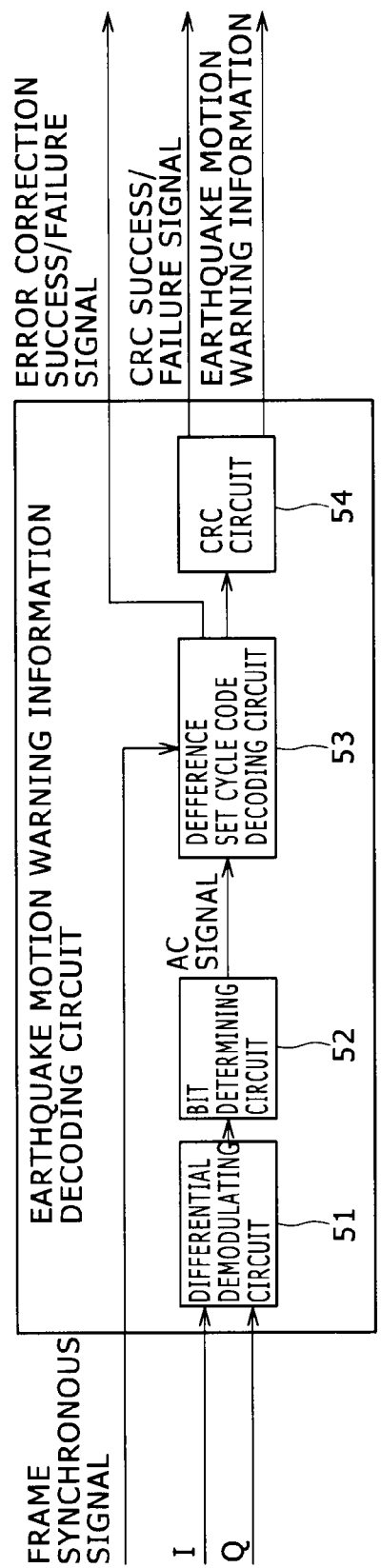
FIG. 2 is a block diagram showing an example of a configuration of an earthquake motion warning information decoding circuit.

Of the constituent elements shown in FIG. 5, the same constituent elements as those shown in FIG. 2 are designated by the same reference numerals, respectively. Also, a repeated description thereof is suitably omitted here for the sake of simplicity.

The configuration of the earthquake motion warning information decoding circuit 40 shown in FIG. 5 is different from that of the earthquake motion warning information decoding circuit 40 shown in FIG. 2 in that an early detection flag generating circuit 55 is provided in addition to the differentially demodulating circuit 51, the bit determining circuit 52, the difference set cycle code decoding circuit 53, and the CRC circuit 54. The AC signal outputted from the synchronization/frame detecting circuit 38 shown in FIG. 4 is inputted to the differentially demodulating circuit 51, and the frame synchronous signal is inputted to each of the difference set cycle code decoding circuit 53 and the early detection flag generating circuit 55.

The differentially demodulating circuit 51 differentially demodulates the AC signal inputted thereto, and generates a complex signal having a signal point corresponding to the original information bit. The signal obtained through the differential demodulation in the differentially demodulating circuit 51 is supplied to the bit determining circuit 52.

The bit determining circuit 52 carries out the bit determination in accordance with the signal obtained through the differential demodulation in the differentially demodulating circuit 51. The bits composing the AC signal, coming to have the form of the bit stream, as the result of the bit determination are successively supplied on one-by-one basis from the head bit to each of the difference set cycle code decoding circuit 53 and the early detection flag generating circuit 55.

The difference set cycle code decoding circuit 53 detects the head of the frame of the AC signal synchronously with the frame synchronous signal inputted thereto. After the difference set cycle code decoding circuit 53 receives up to 204th bit of the AC signal, the difference set cycle code decoding circuit 53 carries out the error correction by using the difference set cycle code contained as the parity bits of 82 bits in the earthquake motion warning information, and outputs the earthquake motion warning information obtained through the error correction to the CRC circuit 54. In addition, the difference set cycle code decoding circuit 53 outputs the error correction success/failure signal representing success or failure in the error correction.

The CRC circuit 54 carries out the CRC by using the CRC code of 10 bits contained in the earthquake motion warning information, and outputs both a CRC success/failure signal representing success or failure in the CRC, and the earthquake motion warning information. Specifically, the earthquake motion warning information outputted from the CRC circuit 54 is partial information of the earthquake motion warning information except for the reference signal, the CRC code, the parity bits, and the like.

The error correction success/failure signal outputted from the difference set cycle code decoding circuit 53, and the CRC success/failure signal and the earthquake motion warning information both outputted from the CRC circuit 54 are all written to the register 12A.

The early detection flag generating circuit 55 detects the head of the frame of the AC signal synchronously with the frame synchronous signal inputted thereto. Also, the early detection flag generating circuit 55 receives the information supplied thereto from the bit determining circuit 52, and determines whether or not the earthquake motion warning information has been transmitted in accordance with the received information before all 204 bits composing the AC signal are received.

The early detection flag generating circuit 55 generates the early detection flag when it is detected that the earthquake motion warning information has been transmitted in accordance with the received partial information on the AC signal, and outputs the early detection flag thus generated. The early detection flag outputted from the early detection flag generating circuit 55 is also written to the register 12A.

The systems for the error detection and the error correction which are adopted in the transmission of the earthquake motion warning information are systems using the CRC code, and the difference set cycle code, respectively. Since each of the systems is a system for adding the parity bits to the data portion, there is no change in the data portion itself during the coding processing. For this reason, if the reception situation is good, it is thought that even when no error connection is carried out, the proper signal can be received on the receiving apparatus 1 side.

In the earthquake motion warning information decoding circuit 40 shown in FIG. 5, it is determined whether or not the earthquake motion warning information has been transmitted in accordance with the received partial information at a timing at which up to the middle of 204 bits composing the AC signal is received.

Hereinafter, a description will be given with respect to the timing at which it is determined whether or not the earthquake motion warning information has been transmitted.

EXAMPLE 1

A description will be given below with respect to the case where it is determined whether or not the earthquake motion warning information has been transmitted at a timing at which 3 bits from 2nd bit to 4th bit of the AC signal are received.

The early detection flag generating circuit 55 receives the 3 bits from 2nd bit to 4th bit of the AC signal. When the 3 bits thus received are either 001 or 110, the early detection flag generating circuit 55 determines that the earthquake motion warning information has been transmitted, and generates the early detection flag. As described above, the fact that the structure identification for the 3 bits from 2nd bit to 4th bit of the AC signal is either 001 or 110 represents that the information following the structure identification is not the additional information on the transmission control for the modulated wave, but is the earthquake motion warning information.

In this case, none of the start/end flag and the signal identification is used in the determination relating to whether or not the earthquake motion warning information has been transmitted. Thus, it is determined whether or not the earthquake motion warning information has been transmitted in accordance with the structure identification without discriminating whether the earthquake motion warning information is transmitted is present or absent.

EXAMPLE 2

A description will be given below with respect to the case where it is determined whether or not the earthquake motion warning information has been transmitted at a timing at which up to predetermined bits previously set in the range of 2nd bit to bits from 5th bit to 17th bit of the AC signal are received.

When the determination is carried out at 17th bit, that is, at the timing at which up to the final bit of the synchronous signal has been received, the early detection flag generating circuit 55 receives 16 bits from 2nd bit to 17th bit of the AC signal. When the structure identification is either 001 or 110, and 13 bits of the synchronous signal agree with 13 bits of the known synchronous signal, the early detection flag generating circuit 55 determines that the earthquake motion warning information has been transmitted, and generates the early detection flag. The bit string (13 bits) of the synchronous signal contained in the earthquake motion warning information is set as the known information in the early detection flag generating circuit 55.

When the determination is carried out before 17th bit, that is, at a timing at which up to the middle of the synchronous signal has been received, the early detection flag generating circuit 55 receives the bits from 2nd bit of the AC signal to a predetermined number bit in the middle of the synchronous signal. When the structure identification is either 001 or 110, and a part of the received synchronous signal agrees with a part of the corresponding known synchronous signal, the early detection flag generating circuit 55 determines that the earthquake motion warning information has been transmitted, and generates the early detection flag.

In this case as well, since none of the start/end flag and the signal identification is used in the determination relating to whether or not the earthquake motion warning information has been transmitted, it is not discriminated whether the earthquake motion warning information is present or absent.

EXAMPLE 3

A description will be given below with respect to the case where it is determined whether or not the earthquake motion warning information has been transmitted at a timing at which the bits from 2nd bit to either 18th bit or 19th bit of the AC signal is received.

When the determination is carried out at the timing at which up to 18th bit is received, the early detection flag generating circuit 55 receives the bits from 2nd bit to 18th bit of the AC signal. When the structure identification is either 001 or 110, and 1st bit, as 18th bit, of the 2 bits of the start/end flag is 0, the early detection flag generating circuit 55 determines that the earthquake motion warning information has been transmitted, and generates the early detection flag.

When the determination is carried out at the timing at which up to 19th bit is received, the early detection flag generating circuit 55 receives the bits from 2nd bit to 19th bit of the AC signal. When the structure identification is either 001 or 110, and 2 bits, as 18th bit and 19th bit, of the start/end flag is 00, the early detection flag generating circuit 55 determines that the earthquake motion warning information has been transmitted, and generates the early detection flag.

As has been described, the start/end flag is 00 when "the earthquake motion warning detailed information is present," and is 11 when "the earthquake motion warning detailed information is absent." Either when 1st bit of the start/end flag is 0, or when 2 bits of the start/end flag are 00, it is possible to determine that "the earthquake motion warning detailed information is present."

In this case, since the start/end flag is used in the determination relating to whether or not the earthquake motion warning information has been transmitted, it is possible to discriminate whether the earthquake motion warning information is present or absent. On the other hand, since no signal identification is used, it is not carried out to discriminate whether the earthquake motion warning information transmitted is a test signal or the expected signal of the earthquake motion warning information, or whether "the appropriate area is present" or "the appropriate area is absent."

The processing may also be executed such that either up to 20th bit or up to 21st bit is received in addition to either up to 18th bit or up to 19th bit is received and the determination is carried out by using 1 bit of 18th bit described above, or the determination is carried out by using 2 bits of 18th bit and 19th bit.

EXAMPLE 4

A description will be given below with respect to the case where it is determined whether or not the earthquake motion warning information has been transmitted at a timing at which the bits from 2nd bit to 24th bit of the AC signal are received.

When the bits from 2nd bit to 24th bit of the AC signal are received, the structure identification is either 001 or 110, the start/end flag is 00, and the signal identification is desired one, the early detection flag generating circuit 55 determines that the earthquake motion warning information has been transmitted, and generates the early detection flag.

As described above, the fact that the signal identification is 000 represents that "an appropriate area of the earthquake motion warning detailed information is present." For example, when the structure identification is either 001 or 110, the start/end flag is 00 and the signal identification is 000, it is determined that the earthquake motion warning information has been transmitted.

When the signal identification is either 010 or 011, and thus it is determined that the test signal has been transmitted, the early detection flag may not be generated. In addition, only when the signal identification is either 000 or 010, and "the appropriate area is present," it is determined that the earthquake motion warning information has been transmitted, and thus the early detection flag may be generated.

Summary of Examples 1 to 4

Figure 6:
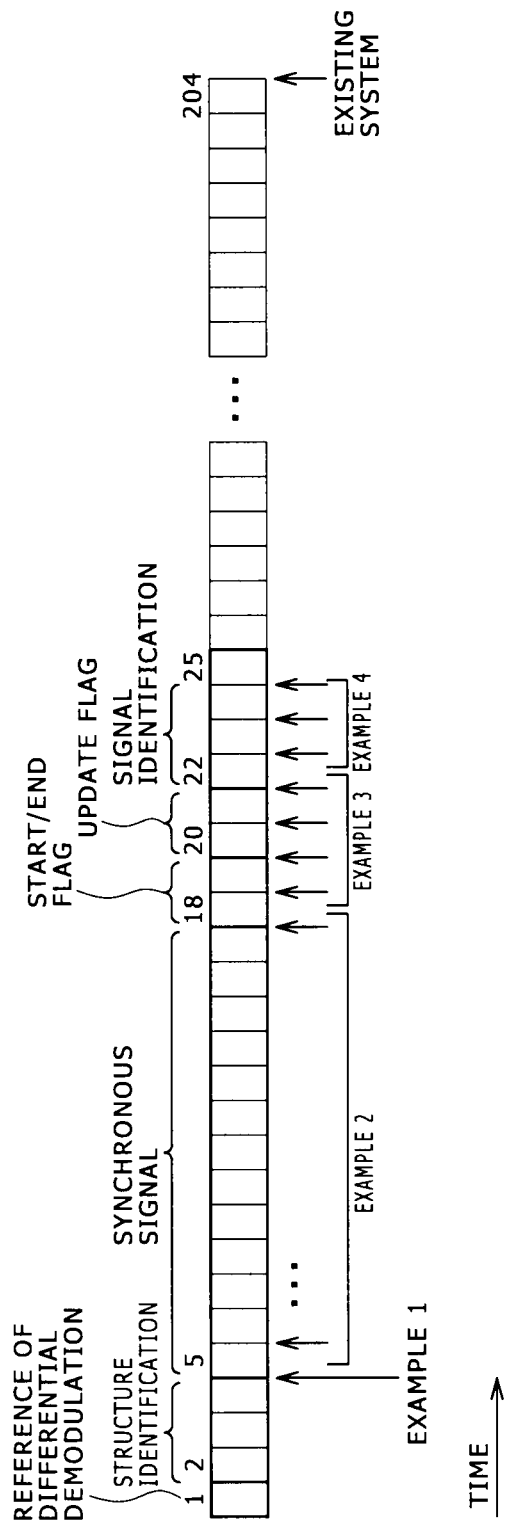
FIG. 6 is a diagram collecting showing Examples 1 to 4.

FIG. 6 is a diagram collectively showing four Examples described above.

In Example 1, the bits from 2nd bit to 4th bit are received, and the structure identification of 3 bits is used in the determination relating to whether or not the earthquake motion warning identification has been transmitted.

In Example 2, the bits of 2nd bit to a predetermined number bit of 13 bits composing the synchronous signal are received, and both the structure identification, and all of or a part of the synchronous signal are used in the determination relating to whether or not the earthquake motion warning identification has been transmitted.

In Example 3, the bits of 2nd bit to 18th bit, 19th bit, 20th bit or 21st bit are received, and both the structure identification and the start/end flag are used in the determination relating to whether or not the earthquake motion warning identification has been transmitted.

In Example 4, the bits of 2nd bit to 24th bit are received, and the structure identification, the start/end flag, and the signal identification are all used in the determination relating to whether or not the earthquake motion warning information has been transmitted.

The four patterns are conceivable as the pattern of the bits used in the determination relating to whether or not the earthquake motion warning identification has been transmitted in such a manner.

[Operation of Receiving Apparatus]

Here, an operation of the receiving portion 12 will be described with reference to a flow chart shown in FIG. 7.

Figure 7:
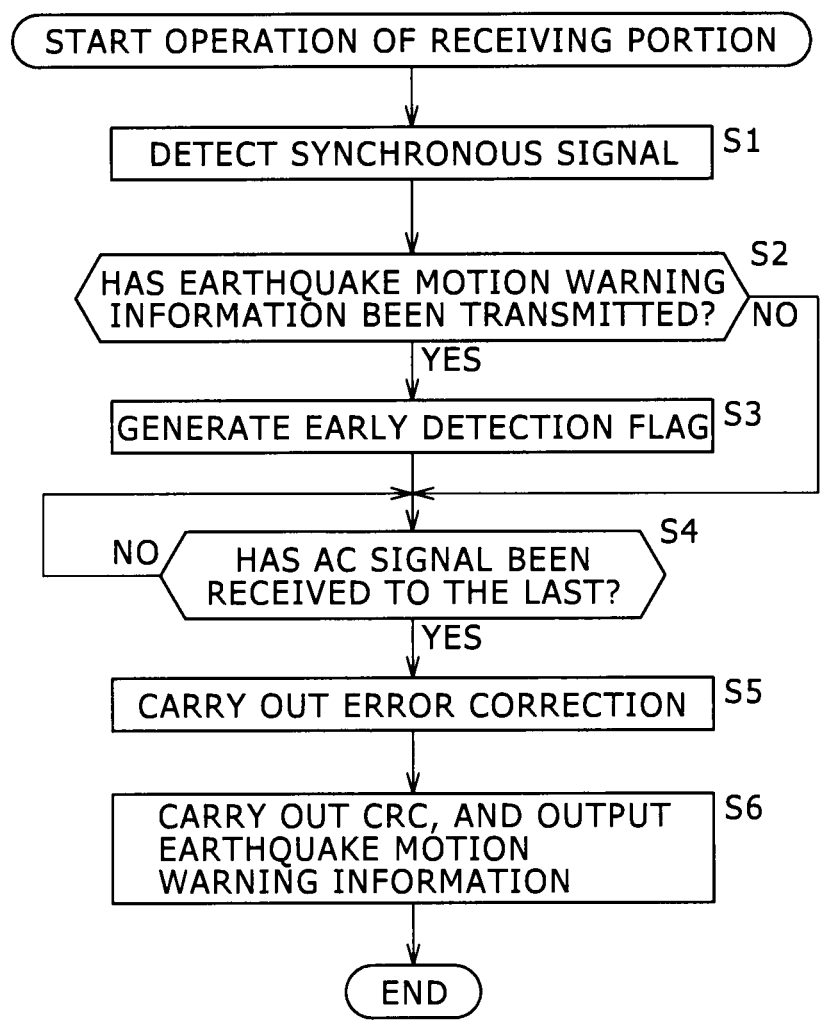
FIG. 7 is a flow chart explaining an operation of the receiving portion having the earthquake motion warning information decoding circuit shown in FIG. 5.

The operation shown in FIG. 7, for example, is started when the AC signal is supplied from the FFT arithmetically operating circuit 35 to the synchronization/frame detecting circuit 38.

In Step S1, the synchronization/frame detecting circuit 38 extracts the AC signal from the predetermined sub-carrier of the signal demodulated by the FFT arithmetically operating circuit 35, and detects the synchronous signal for the AC signal, thereby detecting the boundary of the OFDM frame. The synchronization/frame detecting circuit 38 outputs the frame synchronous signal representing the position of the boundary of the OFDM frame detected together with the AC signal to the earthquake motion warning information decoding circuit 40.

The frame synchronous signal outputted from the synchronization/frame detecting circuit 38 is supplied to each of the difference set cycle code decoding circuit 53 and the early detection flag generating circuit 55 of the earthquake motion warning information decoding circuit 40. In addition, the differentially demodulating circuit 51 carries out the differential demodulation on the AC signal outputted from the synchronization/frame detecting circuit 38, and the bit determining circuit 52 carries out the bit determination. The bits composing the AC signal and outputted from the bit determining circuit 52 are received by each of the difference set cycle code decoding circuit 53 and the early detection flag generating circuit 55 so as to start from the head bit on one-by-one basis.

In Step S2, the early detection flag generating circuit 55 determines whether or not the earthquake motion warning information has been transmitted.

In this case, the determination is carried out in the manner as described with reference to Examples 1 to 4. For example, when it is determined whether or not the earthquake motion warning information has been transmitted at the timing at which the bits from 2nd bit to 4th bit of the AC signal are detected, the early detection flag generating circuit 55 receives the bits from 2nd bit to 4th bit of the AC signal. When the structure identification is either 001 or 110, it is determined in Step S2 that the earthquake motion warning information has been transmitted.

When it is determined in Step S2 that the earthquake motion warning information has been transmitted, in Step S3, the early detection flag generating circuit 55 generates the early detection flag and writes the early detection flag thus generated to the register 12A. On the other hand, when it is determined in Step S2 that the earthquake motion warning information has not yet been transmitted, the processing in Step S3 is skipped.

In Step S4, the difference set cycle code decoding circuit 53 determines whether or not 204 bits composing the AC signal have been received to the last, and waits until it is determined that 204 bits composing the AC signal have been received to the last. When it is determined in Step S4 that 204 bits composing the AC signal have been received to the last, in Step S5, the difference set cycle code decoding circuit 53 subjects the earthquake motion warning information to the error correction by the difference set cycle code. The difference set cycle code decoding circuit 53 outputs the earthquake motion warning information subjected to the error correction to the CRC circuit 54, and outputs the error correction success/failure signal to the outside.

In Step S6, the CRC circuit 54 carries out the CRC by the CRC code of 10 bits contained in the earthquake motion warning information, and outputs both the CRC success/failure signal representing success or failure of the CRC, and the earthquake motion warning information. After that, the operation of the receiving portion 12 is completed. By outputting the early detection flag in the manner described above, the receiving portion 12 can inform the controller 16 of that the earthquake motion warning information has been transmitted before the AC signal has been received to the last.

Next, an operation of the controller 16 which is carried out so as to correspond to the operation of the receiving portion 12 shown in FIG. 7 will be described with reference to a flow chart shown in FIG. 8.

Figure 8:
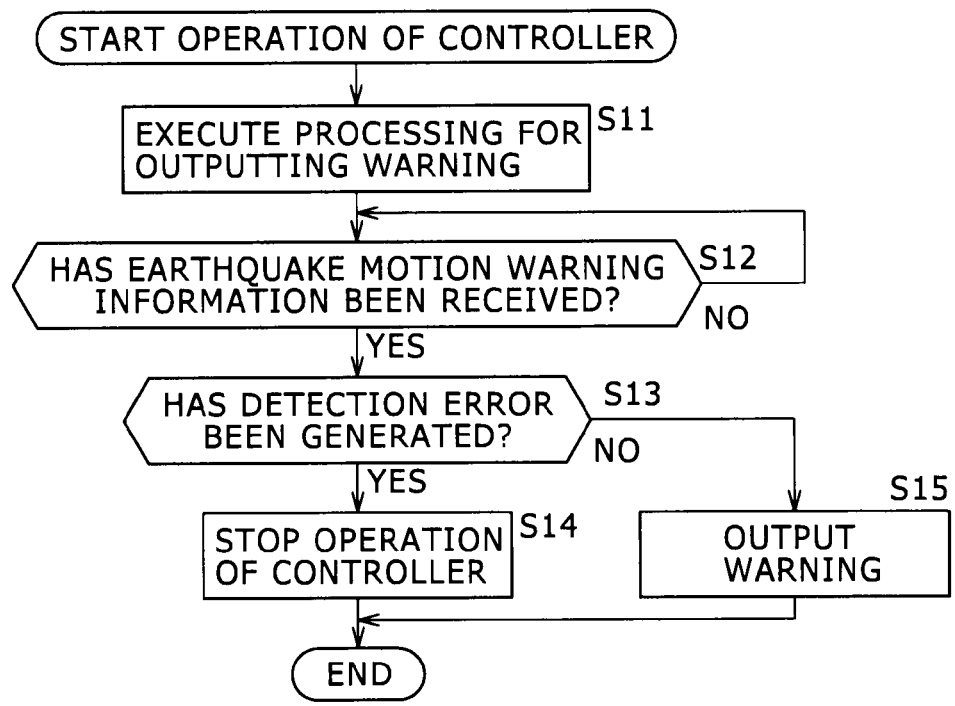
FIG. 8 is a flow chart explaining an operation of a controller shown in FIG. 3.

The operation of the controller 16 shown in FIG. 8, for example, is carried out when the controller 16 detects that the early detection flag is stored through the polling as processing for repeatedly confirming the information stored in the register 12A with a predetermined cycle.

In Step S11, the controller 16 executes processing for outputting a warning. For example, when the receiving apparatus 1 is in the stand-by state, and the user is informed of the information on the earthquake by displaying an image on the screen of the display portion 15, processing for activating the display portion 15 is started to be executed.

The receiving apparatus 1 has a stand-by state in which although a main power source is in an ON state, none of the display portion 15 and the speaker 17 is activated, and thus none of the display of the image on the screen and the sound output is carried out as well as an ON state in which the display portion 15 is activated and the display of the image such as an image of a program on the screen is carried out. When in the stand-by state, for example, a power source button of a remote controller is depressed, the state of the receiving apparatus 1 is changed from the stand-by state over to the ON state, and the picture display is started.

It is noted that even in the stand-by state as well, the receiving portion 12 is in the activation state, and thus the operation described with reference to FIG. 7 is carried out by the receiving portion 12. In addition, the polling by the controller 16 is also carried out. In a phase of the stand-by state of the receiving apparatus 1, the power consumption may be suppressed so as not to supply a power source to each of the carrier demodulating circuit 36, the error correcting circuit 37, and the transmission control information decoding circuit 39 of the constituent elements composing the receiving portion 12.

After activation of the display portion 15, a message representing that the earthquake motion warning information has been transmitted may be displayed on the display portion 15, or a black image may also be displayed on the display portion 15 until the controller 16 receives the earthquake motion warning information.

In addition, when the receiving apparatus 1 is in the stand-by state, and thus the information on the earthquake is noticed in the form of the sound to the user, processing for activating the speaker 17 is started to be executed.

In Step S12, the controller 16 determines whether or not the earthquake motion warning information has been received, and waits until it is determined that the earthquake motion warning information has been received.

The polling by the controller 16 is also carried out after the early detection flag has been read out from the register 12A. When it is confirmed that the earthquake motion warning information outputted from the CRC circuit 54 of the earthquake motion warning information decoding circuit 40 is previously stored in the register 12A through the polling, the earthquake motion warning information is read out from the register 12A and is then received by the controller 16.

When it is determined in Step S12 that the earthquake motion warning information has been received, in Step S13, the controller 16 determines whether or not the detection error has been generated.

For example, when the signal identification contained in the earthquake motion warning information received after generation of the early detection flag has the bits other than 000 in the case of Examples 1 to 3, the controller 16 determines that the detection error has been generated. The fact that the signal identification is 000 represents that "an appropriate area of the earthquake motion warning detailed information is present."

In addition, in the case of Example 3, when an error is contained in the start/end flag when the early detection flag is generated, and 2 bits of the start/end flag are determined to be 00 although 2 bits of the start/end flag are 11 by right, thereby sending the early detection flag, the controller 16 determines that the detection error has been generated because 2 bits of the start/end flag contained in the earthquake motion warning information subjected to the error correction, and received after the early detection flag has been sent are 11.

As described as Example 1, when the 3 bits from 2nd bit to 4th bit of the AC signal are received and it is then determined whether or not the earthquake motion warning information has been transmitted, whether the earthquake motion warning detailed information is present or absent is not discriminated in this determination in accordance with the signal identification. This also applies to each of Examples 2 and 3.

Therefore, when the structure identification is either 001 or 110, and the signal identification is any one of 001, 010 and 011, although the earthquake is not actually generated with the area in which the receiving apparatus 1 is installed as an object, the early detection flag is generated by the receiving portion 12, and thus processing for outputting the warning is started to be executed by the controller 16.

As described above, 001 of the signal identification represents "an appropriate area of the earthquake motion warning detailed information is absent," 010 of the signal identification represents "an appropriate area of the test signal of the earthquake motion warning detailed information is absent." Also, 011 of the signal identification represents "an appropriate area of the test signal of the earthquake motion warning detailed information is absent." Even in the case where the structure identification is either 001 or 110, and thus the earthquake motion warning information has been transmitted, when the signal identification is any one of 001, 010 and 011, earthquake is not actually generated with the area in which the receiving apparatus 1 is installed as the object.

When although the early detection flag is received, it is confirmed that earthquake is not actually generated with the area in which the receiving apparatus 1 is installed as the object in accordance with the earthquake motion warning information which is thereafter received, it is determined that the detection error is generated.

When it is determined in Step S13 that the detection error is generated, in Step S14, the controller 16 stops the processing for outputting the warning.

When the activation of the display portion 15 has been completed and thus the state in which the black image is displayed is held until the earthquake motion warning information is received, the receiving apparatus 1 is set in the stand-by state again without displaying any other image on the display portion 15. In this case, a message for informing the user of the mal-detection of the earthquake motion warning information may be displayed on the display portion 15.

On the other hand, when it is determined in Step S13 that no detection error is generated, in Step S15, the controller 16 outputs the warning in accordance with the earthquake motion warning information.

For example, when the controller 16 informs the user of the information on the earthquake through the picture display on the display portion 15, the controller 16 causes the display portion 15 to display thereon an area where the earthquake is generated on a map in accordance with the information representing the objective area of the earthquake motion warning, causes the display portion 15 to display thereon an image of an earthquake center on a map based on the information, on the earthquake center, of the earthquake motion warning, or causes the display portion 15 to display thereon data on time of generation of the earthquake based on the time of generation of the earthquake.

In addition, when the controller 16 informs the user of the information on the earthquake through the sound, the controller 16 specifies the time of generation of the earthquake, the area of generation of the earthquake, and the earthquake center in accordance with the information which has been transmitted thereto as the earthquake motion warning detailed information, and outputs the sound for noticing these pieces of information to the user from the speaker 17.

Either after the processing for outputting the warning is stopped in Step S14, or after the warning is outputted in Step S15, the operation of the controller 16 shown in FIG. 8 is completed.

By executing the processing described above, before the earthquake motion warning information is actually received even when the receiving apparatus 1 is in the stand-by state, the controller 16 can start a preparation for informing the user of the information on the earthquake.

In addition, since the activation of the display portion 15 and the speaker 17 is firstly carried out, the controller 16 can rapidly inform the user of the information on the earthquake after having received the earthquake motion warning information.

[Change]

In the foregoing, each of the early detection flag and the earthquake motion warning information which are outputted from the receiving portion 12 is received by the controller 16 through the polling. However, each of the early detection flag and the earthquake motion warning information may be directly transmitted from the receiving portion 12 to the controller 16.

Figure 9:
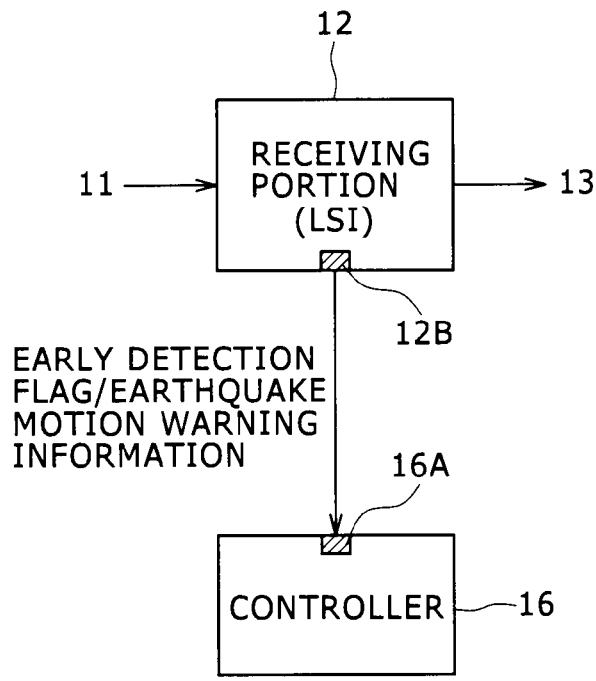
FIG. 9 is a diagram showing connection between the receiving portion and the controller.

FIG. 9 is a diagram showing an example of connection between the receiving portion 12 and the controller 16.

In the example of connection between the receiving portion 12 and the controller 16 shown in FIG. 9, a pin 12B of a Large Scale Integrated Circuit (LSI) realizing the receiving portion 12, and an interrupt pin 16A of an LSI realizing the controller 16 are directly connected to each other.

When it is determined in the manner described above that the earthquake motion warning information has been transmitted, the early detection flag generating circuit 55 (refer to FIG. 5) of the receiving portion 12 generates the early detection flag. The early detection flag which has been generated by the early detection flag generating circuit 55 is outputted through the pin 12B to be inputted to the interrupt pin 16A of the controller 16.

Likewise, the earthquake motion warning information outputted from the CRC circuit 54 of the receiving portion 12 is not written to the register 12A, but is outputted through the pin 12B to be inputted to the interrupt pin 16A of the controller 16.

When the early detection flag has been received at the interrupt pin 16A, the controller 16 starts the operation described with reference to FIG. 8 in priority to any of other operations. Also, when the earthquake motion warning information has been received at the interrupt pin 16A, the controller 16 outputs the information on the earthquake.

In the case where each of the early detection flag and the earthquake motion warning information is received by the controller 16 through the polling, even when these pieces of information are written to the register 12A of the receiving portion 12, the controller 16 cannot read out any of these pieces of information in a minute depending on timings of the polling, and thus a delay is caused in some cases.

Each of the early detection flag and the earthquake motion warning information is directly inputted from the receiving portion 12 to the interrupt pin 16A of the controller 16 in such a manner, whereby it is possible to prevent such a delay from being caused.

<Second Embodiment>

Figure 10:
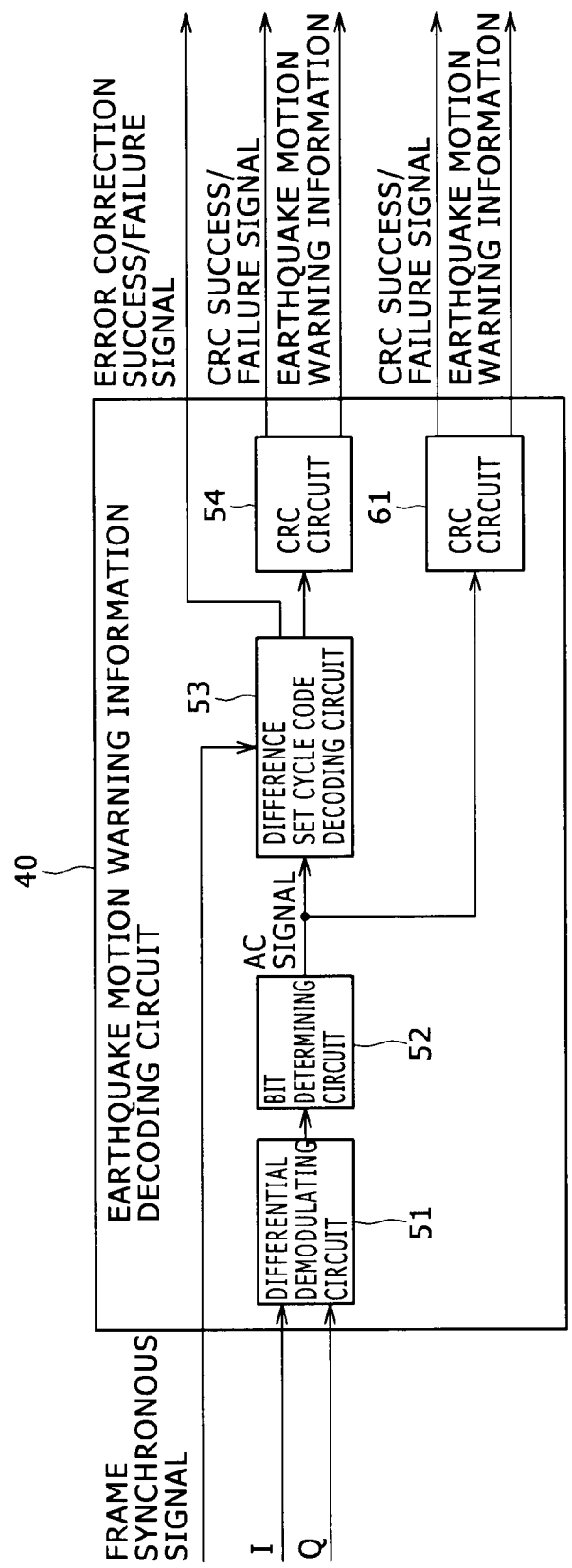
FIG. 10 is a block diagram showing another example of a configuration of the earthquake motion warning information decoding circuit in the receiving portion of the receiving apparatus according to the first embodiment of the present invention.

FIG. 10 is a block diagram showing another example of a configuration of the earthquake motion warning information decoding circuit 40 shown in FIG. 4.

Of the constituent elements shown in FIG. 10, the same constituent elements as those shown in FIG. 2 are designated by the same reference numerals, respectively, and a repeated description thereof is suitably omitted here for the sake of simplicity.

The configuration of the earthquake motion warning information decoding circuit 40 shown in FIG. 10 is different from that of the earthquake motion warning information decoding circuit 40 shown in FIG. 2 in that a CRC circuit 61 is provided in addition to the differentially demodulating circuit 51, the bit determining circuit 52, the difference set cycle decoding circuit 53, and the CRC circuit 54. The AC signal outputted from the synchronization/frame detecting circuit 38 shown in FIG. 4 is inputted to the differentially demodulating circuit 51, and the frame synchronous signal is inputted to the difference set cycle decoding circuit 53.

The differentially demodulating circuit 51 shown in FIG. 10 differentially demodulates the AC signal inputted thereto, thereby generating a complex signal having a signal point corresponding to the original information bit. A signal obtained through the differential demodulation in the differentially demodulating circuit 51 is supplied to the bit determining circuit 52.

The bit determining circuit 52 carries out the bit determination in accordance with the signal obtained through the differential demodulation. The bits of the AC signal coming to have a form of a bit stream as the result of the bit determination are supplied to each of the difference set cycle decoding circuit 53 and the CRC circuit 61 so as to start from the head bit on one-by-one basis.

The difference set cycle decoding circuit 53 detects the head of the frame of the AC signal in accordance with the frame synchronous signal inputted thereto. After the difference set cycle decoding circuit 53 has received up to 204th bit of the AC signal, the difference set cycle decoding circuit 53 carries out the error correction by using the difference set cycle code contained as the parity bits of 82 bits in the earthquake motion warning information. Then, the difference set cycle decoding circuit 53 outputs the earthquake motion warning information subjected to the error correction to the CRC circuit 54.

The CRC circuit 54 carries out the CRC by using the CRC code of 10 bits contained in the earthquake motion warning information supplied thereto from the difference set cycle decoding circuit 53, and outputs both the CRC success/failure signal representing success or failure in the CRC, and the earthquake motion warning information.

The CRC circuit 61 successively receives the information supplied thereto from the bit determining circuit 52, and carries out the CRC at the timing at which up to 122nd bit is received, that is, at the timing at which the CRC code is received to the last by using the CRC code without receiving up to 204th bit as the final bit composing the AC signal. The frame synchronous signal supplied from the synchronization/frame detecting circuit 38 is suitably used in the reception of the CRC code.

Figure 1:
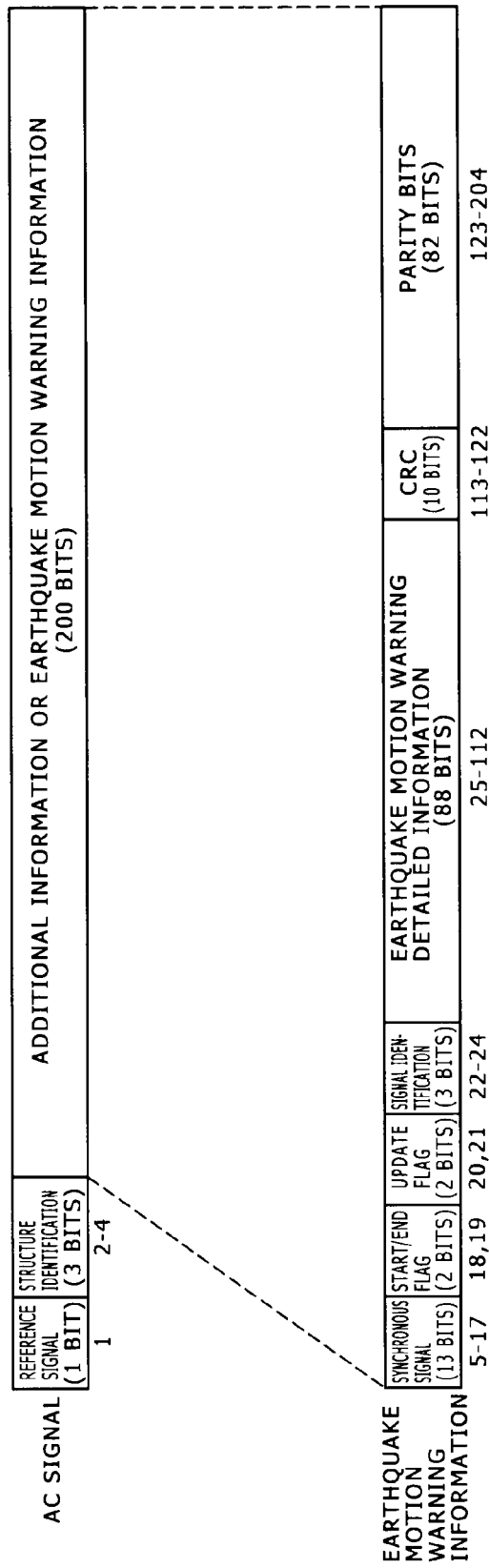
FIG. 1 is a diagram showing a frame structure of an AC signal.

As previously described with reference to FIG. 1, since the CRC code of 10 bits of the AC signal is transmitted before the parity bits of 82 bits, the CRC can be carried out at the timing at which the CRC code of 10 bits is received.

The CRC circuit 61 outputs both the CRC success/failure detecting signal representing success or failure in the CRC, and the earthquake motion warning information. When time takes the CRC circuit 54 to carry out the CRC, and time it takes the CRC circuit 61 to carry out the CRC are equal to each other, the earthquake motion warning information is outputted from the CRC circuit 61 before the earthquake motion warning information is outputted from the CRC circuit 54.

Both the earthquake motion warning information outputted from the CRC circuit 54, and the earthquake motion warning information outputted from the CRC circuit 61 are written to the register 12A, and are then read out by the controller 16.

In addition, both the earthquake motion warning information outputted from the CRC circuit 54, and the earthquake motion warning information outputted from the CRC circuit 61 may be directly inputted to the interrupt pin 16A of the controller 16 in the manner described with reference to FIG. 9.

As described above, in the earthquake motion warning information decoding circuit 40 shown in FIG. 10, when success is made in the CRC, the earthquake motion warning information is outputted from the CRC circuit 61 without carrying out the error correction by using the difference set cycle code. As a result, the earthquake motion warning information can be speedily transmitted to the controller 16 as compared with the case where the earthquake motion warning information is outputted after the AC signal is received to the last and the error correction is carried out by using the difference set cycle code.

It is noted that although the two CRC circuits of the CRC circuit 54 and the CRC circuit 61 are provided in the earthquake motion warning information decoding circuit 40 shown in FIG. 10, one CRC circuit which realizes the functions of the CRC circuit 54 and the CRC circuit 61 may be provided.

The one CRC circuit carries out the CRC at the timing at which the CRC code has been received, and outputs both the CRC success/failure signal and the earthquake motion warning information. Also, the one CRC circuit carries out the CRC at the timing as well at which the earthquake motion warning information has been supplied thereto from the difference set cycle code decoding circuit 53, and outputs both the CRC success/failure signal and the earthquake motion warning information.

An operation of the receiving portion 12 having the earthquake motion warning information decoding circuit 40 shown in FIG. 10 will be described below with reference to a flow chart shown in FIG. 11.

Figure 11:
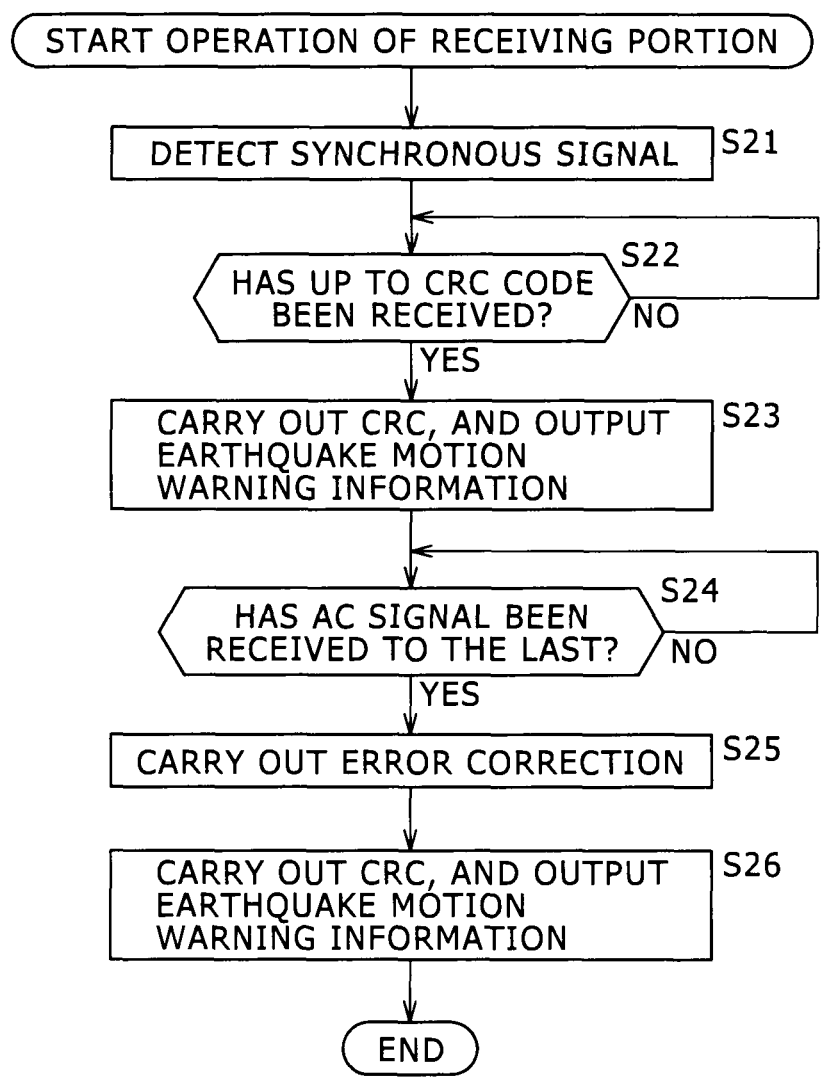
FIG. 11 is a flow chart explaining an operation of the receiving portion having the earthquake motion warning information decoding circuit shown in FIG. 10.

The operation shown in FIG. 11, for example, also starts to be carried out when the AC signal has been supplied from the FFT arithmetically operating circuit 35 to the synchronization/frame detecting circuit 38.

In Step S21, the synchronization/frame detecting circuit 38 extracts the AC signal from the predetermined sub-carrier of the signal demodulated by the FFT arithmetically operating circuit 35, and detects the synchronous signal for the AC signal, thereby detecting the boundary of the OFDM frame. The synchronization/frame detecting circuit 38 outputs the frame synchronous signal representing the boundary, of the OFDM frame, thus detected together with the AC signal to the earthquake motion warning information decoding circuit 40.

The frame synchronous signal outputted from the synchronization/frame detecting circuit 38 is supplied to the difference set cycle code demodulating circuit 53 of the earthquake motion warning information decoding circuit 40. In addition, the differential modulation is carried out in the differentially demodulating circuit 51 with the AC signal outputted from the synchronization/frame detecting circuit 38 as the object, and the bit determination is carried out in the bit determining circuit 52. The bits composing the AC signal and outputted from the bit determining circuit 52 are supplied to each of the difference set cycle code demodulating circuit 53 and the CRC circuit 61 so as to start from the head bit on one-by-one basis.

In Step S22, the CRC circuit 61 determines whether or not up to the CRC code has been received and waits until up to the CRC code has been received.

When it is determined in Step S22 that up to the CRC code has been received, in Step S23, the CRC circuit 61 carries out the CRC by using the CRC code, and outputs both the CRC success/failure signal and the earthquake motion warning information. When the CRC code has been received by the CRC circuit 61, up to the CRC code has been received in the difference set cycle code decoding circuit 53 as well.

In Step S24, the difference set cycle code demodulating circuit 53 determines whether or not 204th bit as the final bit of the AC signal has been received, and waits until 204th bit as the final bit of the AC signal has been received.

When it is determined in Step S24 that 204th bit as the final bit of the AC signal has been received, in Step S25, the difference set cycle code demodulating circuit 53 carries out the error correction by using the difference set cycle code. Then, the difference set cycle code demodulating circuit 53 outputs the error correction success/failure signal to the outside, and outputs the earthquake motion waiting information subjected to the error correction to the CRC circuit 54.

In Step S26, the CRC circuit 54 carries out the CRC by using the CRC code contained in the earthquake motion waiting information supplied thereto from the difference set cycle code demodulating circuit 53, and outputs both the CRC success/failure signal and the earthquake motion waiting information. After that, the operation of the receiving portion 12 shown in FIG. 11 is completed.

By executing the processing described above, the earthquake motion waiting information can be speedily transmitted to the controller 16.

<Third Embodiment>

Figure 12:
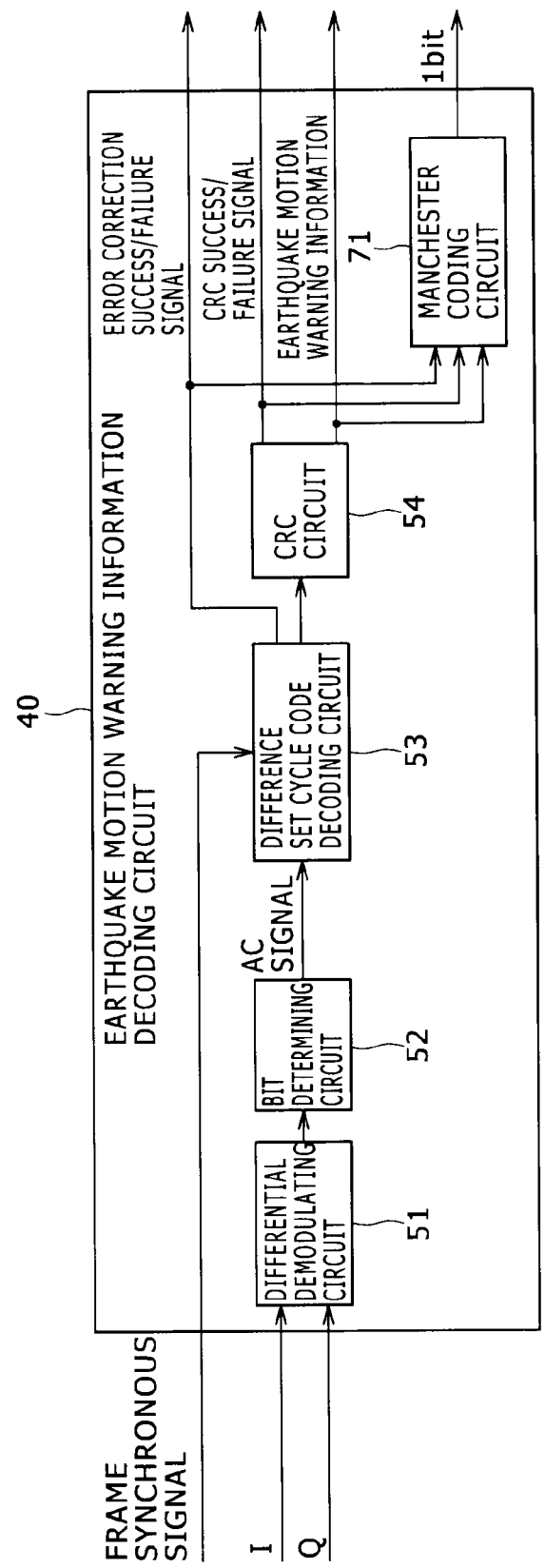
FIG. 12 is a block diagram showing a further example of a configuration of the earthquake motion warning information decoding circuit in the receiving portion of the receiving apparatus according to the first embodiment of the present invention.

FIG. 12 is a block diagram showing a further example of a configuration of the earthquake motion warning information decoding circuit 40 shown in FIG. 4.

Of the constituent elements shown in FIG. 12, the same constituent elements as those shown in FIG. 2 are designated by the reference numerals, respectively, and a repeated description thereof is suitably omitted here for the sake of simplicity.

The configuration of the earthquake motion warning information decoding circuit 40 shown in FIG. 12 is different from that of the earthquake motion warning information decoding circuit 40 shown in FIG. 2 in that a Manchester coding circuit 71 is provided in addition to the differentially demodulating circuit 51, the bit determining circuit 52, the difference set cycle decoding circuit 53, and the CRC circuit 54. The AC signal outputted from the synchronization/frame detecting circuit 38 shown in FIG. 4 is inputted to the differentially demodulating circuit 51, and the frame synchronous signal is inputted to the difference set cycle decoding circuit 53.

The differentially demodulating circuit 51 shown in FIG. 12 differentially demodulates the AC signal inputted thereto, thereby generating a complex signal having a signal point corresponding to the original information bit. A signal obtained through the differential demodulation in the differentially demodulating circuit 51 is supplied to the bit determining circuit 52.

The bit determining circuit 52 carries out the bit determination in accordance with the signal obtained through the differential demodulation. The bits composing the AC signal coming to have a form of a bit stream as the result of the bit determination are supplied to the difference set cycle decoding circuit 53 so as to start from the head bit on one-by-one basis.

The difference set cycle decoding circuit 53 detects the head of the frame of the AC signal in accordance with the frame synchronous signal inputted thereto. After the difference set cycle decoding circuit 53 has received up to 204th bit of the AC signal, the difference set cycle decoding circuit 53 carries out the error correction by using the difference set cycle code contained as the parity bits of 82 bits in the earthquake motion warning information. Then, the difference set cycle decoding circuit 53 outputs the earthquake motion warning information subjected to the error correction to the CRC circuit 54. In addition, the difference set cycle decoding circuit 53 outputs the error correction success/failure signal. The error correction success/failure signal outputted from the difference set cycle decoding circuit 53 is supplied to the outside of the earthquake motion warning information decoding circuit 40, and is also supplied to the Manchester coding circuit 71.

The CRC circuit 54 carries out the CRC by using the CRC code of 10 bits contained in the earthquake motion warning information supplied thereto from the difference set cycle decoding circuit 53, and outputs both the CRC success/failure signal representing success or failure in the CRC, and the earthquake motion warning information. Both the CRC success/failure signal and the earthquake motion warning information which have been outputted from the CRC circuit 54 are supplied to the outside of the earthquake motion warning information decoding circuit 40, and are also supplied to the Manchester coding circuit 71.

When it is detected that the difference set cycle code decoding circuit 53 has succeeded in the error correction, and the CRC circuit 54 has also succeeded in the CRC, the Manchester coding circuit 71 Manchester-codes a part of or all of the earthquake motion waiting information supplied thereto from the CRC circuit 54. It is determined whether or not the difference set cycle code decoding circuit 53 has succeeded in the error correction in accordance with the error correction success/failure signal, and it is determined whether or not the CRC circuit 54 has succeeded in the CRC in accordance with the CRC success/failure signal.

The Manchester coding circuit 71 adds a preamble composed of a predetermined number of bits such as "00001" to the head of the earthquake motion warning information after having been Manchester-coded, and outputs the resulting earthquake motion warning information.

The resulting earthquake motion warning information outputted from the Manchester coding circuit 71 is inputted to the interrupt pin 16A of the controller 16. That is to say, as previously described with reference to FIG. 9, the receiving portion 12 having the earthquake motion warning information decoding circuit 40 shown in FIG. 12 is realized by the LSI having the pin 12B connected to the interrupt pin 16A of the controller 16.

The processing for informing the user of the information on the earthquake is executed in the controller 16 which has received the earthquake motion warning information outputted thereto from the Manchester coding circuit 71.

As described above, when the earthquake motion warning information is supplied to the controller 16 via the register of the I2C, the delay is caused depending on the timings of the polling in some cases. The earthquake motion warning information itself is outputted from the pin 12B of the LSI (the receiving portion 12) connected to the interrupt pin 16A of the controller 16, whereby the delay caused by polling is avoided, thereby making it possible to speedily transmit the earthquake motion warning information to the controller 16.

Here, since it is necessary to ensure the pins through which the video data and the audio data are supplied to the MPEG decoding portion 13, and so forth, of the pins mounted to the LSI which realizes the receiving portion 12, many pins cannot be allocated as the pins through which the earthquake motion warning information is transmitted.

The earthquake motion warning information is Manchester-coded, and is then outputted on one-by-one basis, whereby the earthquake motion warning information can be transmitted to the controller 16 through one pin. Since according to the Manchester coding, a signal level is changed either from a High level to a Low level, or from a Low level to a High Level every one bit cycle, it becomes easy to ensure the synchronization in the controller 16 as well.

In the case where the Manchester coding is utilized, when 0 continuously appears, or when 1 continuously appears, if the code is shifted by one bit, a continuous signal of 1 is regarded as a continuous signal of 0, or a continuous signal of 0 is regarded as a continuous signal of 1. The preamble is added to the earthquake motion warning information and the resulting earthquake motion warning information is outputted, whereby the start position of the earthquake motion warning information can be readily detected by the controller 16.

A Non Return to Zero (NRZ) code, a differential Manchester code, a Return to Zero (RZ) code, a bipolar code or the like may also be used instead of using the Manchester code.

An operation of the receiving portion 12 having the earthquake motion warning information decoding circuit 40 shown in FIG. 12 will be described below with reference to a flow chart shown in FIG. 13.

Figure 13:
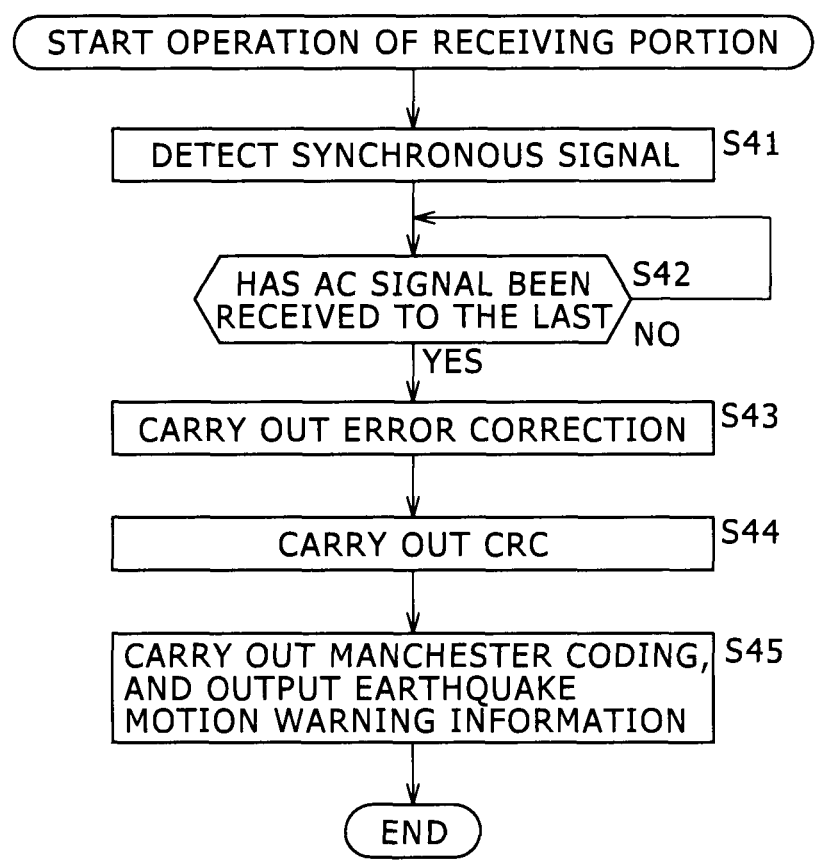
FIG. 13 is a flow chart explaining an operation of the receiving portion having the earthquake motion warning information decoding circuit shown in FIG. 12.

The operation shown in FIG. 13, for example, also starts to be carried out when the AC signal has been supplied from the FFT arithmetically operating circuit 35 to the synchronization/frame detecting circuit 38.

In Step S41, the synchronization/frame detecting circuit 38 extracts the AC signal from the predetermined sub-carrier of the signal demodulated by the FFT arithmetically operating circuit 35, and detects the synchronous signal for the AC signal, thereby detecting the boundary of the OFDM frame. The synchronization/frame detecting circuit 38 outputs the frame synchronous signal representing the boundary, of the OFDM frame, thus detected together with the AC signal to the earthquake motion warning information decoding circuit 40.

The frame synchronous signal outputted from the synchronization/frame detecting circuit 38 is supplied to the difference set cycle code demodulating circuit 53 of the earthquake motion warning information decoding circuit 40. In addition, the differential modulation is carried out in the differentially demodulating circuit 51 with the AC signal outputted from the synchronization/frame detecting circuit 38 as the object, and the bit determination is carried out in the bit determining circuit 52. The bits composing the AC signal and outputted from the bit determining circuit 52 are supplied to the difference set cycle code demodulating circuit 53 so as to start from the head bit on one-by-one basis.

In Step S42, the difference set cycle code demodulating circuit 53 determines whether or not 204th bit as the final bit of the AC signal has been received, and waits until 204th bit as the final bit of the AC signal has been received.

When it is determined in Step S42 that 204th bit as the final bit of the AC signal has been received, in Step S43, the difference set cycle code demodulating circuit 53 carries out the error correction by using the difference set cycle code. Then, the difference set cycle code demodulating circuit 53 outputs the error correction success/failure signal to the outside, and outputs the earthquake motion waiting information subjected to the error correction to the CRC circuit 54.

In Step S44, the CRC circuit 54 carries out the CRC by using the CRC code contained in the earthquake motion waiting information supplied thereto from the difference set cycle code demodulating circuit 53, and outputs both the CRC success/failure signal and the earthquake motion waiting information.

In Step S45, when it is detected that the difference set cycle code decoding circuit 53 has succeeded in the error correction, and the CRC circuit 54 has also succeeded in the CRC, the Manchester coding circuit 71 Manchester-codes the earthquake motion waiting information supplied thereto from the CRC circuit 54 and outputs the resulting earthquake motion waiting information.

In the controller 16 which has received the earthquake motion waiting information subjected to the Manchester coding at the interrupt pin 16A, the decoding processing is executed and the processing for informing the user of the information on the earthquake is executed. After that, the operation of the receiving portion 12 shown in FIG. 13 is completed.

By extending the processing described above, it is possible to avoid the generation of the delay due to the polling, and the earthquake motion waiting information can be speedily transmitted to the controller 16.

It is noted that the processing may also be adopted that the Manchester coding is not carried out for the earthquake motion waiting information itself, but is carried out for the early detection flag described in the first embodiment, and the early detection flag after completion of the Manchester coding is supplied to the interrupt pin 16A of the controller 16.

In this case, the Manchester coding circuit 71 is provided in the subsequent stage of the early detection flag generating circuit 55 shown in FIG. 5, and thus the Manchester coding is carried out. It is also possible that the preamble composed of a predetermined number of bits is added to the early detection flag after completion of the Manchester coding by the Manchester coding circuit 71.

<Fourth Embodiment>

It is possible that the determination relating to whether or not the earthquake motion warning information as described above has been transmitted, and the reception of the earthquake motion warning information as described above are carried out when the receiving apparatus 1 is in the stand-by state and then the reception of a plurality of segments (either 3 segments or 13 segments) is not required.

When the receiving apparatus 1 is in the stand-by state, of 13 segments regulated by the ISDB-T standard, only one segment of No. 0 located at the center when 13 segments are arranged on the frequency axis is tuned in the receiving portion 12. The determination relating to whether or not the earthquake motion warning information as described above has been transmitted, and the reception of the earthquake motion warning information as described above are carried out in accordance with the signal using the AC carrier in one segment of No. 0.

Figure 14:
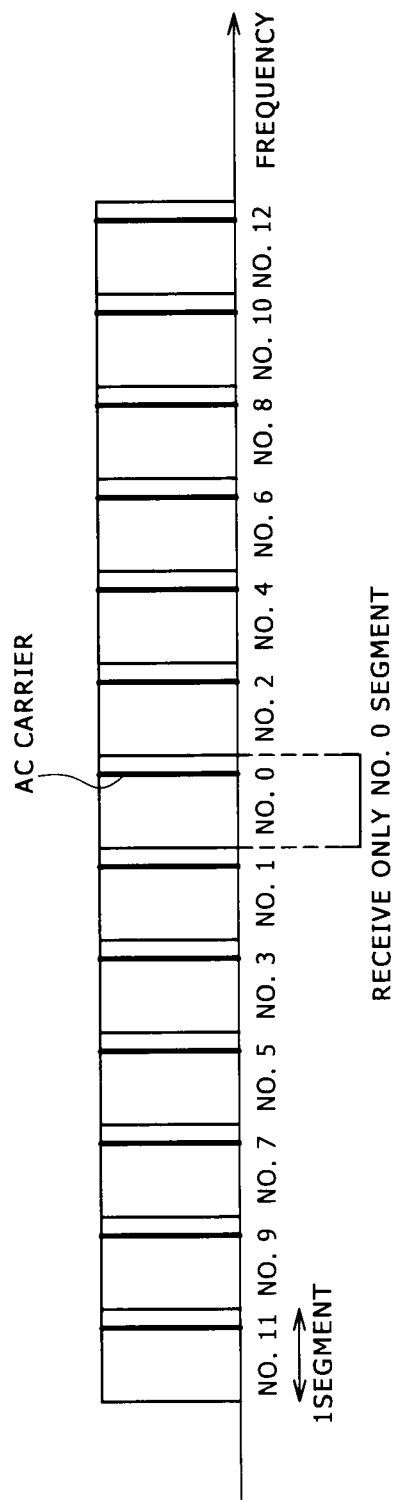
FIG. 14 is a diagram showing segments contained in one physical channel.

FIG. 14 is a diagram showing segments contained in one physical channel and regulated by the ISDB-T standard.

In the ISDM-T standard, the frequency band (6 MHz) of one physical channel is divided into 13 segments. The AC carriers are provided in the respective segments as indicated by solid lines within the respective segments. The earthquake motion warning information is transmitted by the AC carrier in the segment of No. 0.

Therefore, it is possible to carry out determination relating to whether or not the earthquake motion warning information as described above has been transmitted, and the reception of the earthquake motion warning information as described above are carried out as long as the AC carrier in the segment of No. 0 is received.

As a result, the power consumption of the receiving apparatus 1 can be suppressed as compared with the case where all 13 segments are received in order to carry out determination relating to whether or not the earthquake motion warning information has been transmitted, and the reception of the earthquake motion warning information. Although when a hi-vision television broadcasting is received, the AC carriers in 12 segments other than the segment of No. 0 need to be received, the AC carriers in 12 segments other than the segment of No. 0 need not to be received in the stand-by state in which no screen display is carried out.

It is noted that 3 bits of the structure identification of the AC signal is transmitted at the same timing as that for the TMCC signal even in the AC carrier of any other segment. Even when only the AC carrier in the segment of No. 0 is received, the modulation system which is resistant to the noises as with the DQPSK modulation is used as the modulation system for the bits of the structure identification and in addition thereto, the bits having the same structure identification are transmitted by using a plurality of AC carriers. Therefore, it is possible to obtain the sufficient reception performance.

A current state is switched over to a state in which all 13 segments are received either at a timing at which the early detection flag generated by the receiving portion 12 has been received by the controller 16, or at a timing at which the earthquake motion warning information decoded by the receiving portion 12 has been received by the controller 16.

Figure 15:
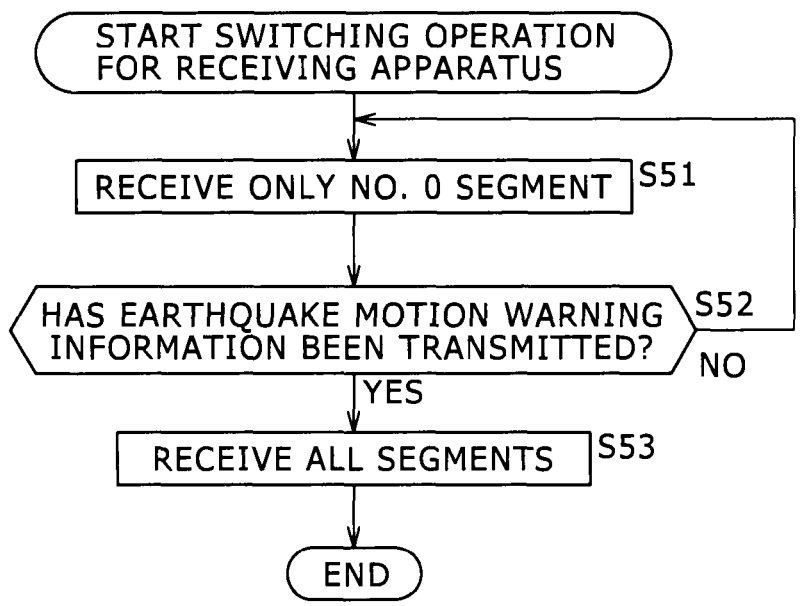
FIG. 15 is a flow chart explaining a switching operation for the receiving portion having the earthquake motion warning information decoding circuit shown in FIG. 12.

An operation for switching the current state over to the reception state in the receiving apparatus 1 will be described below with reference to a flow chart shown in FIG. 15.

This operation, for example, is started to be carried out when the state of the receiving apparatus 1 is in the stand-by state.

In Step S51, the receiving portion 12 receives only the AC carrier in the segment of No. 0, and carries out the determination relating to whether or not the earthquake motion warning information has been transmitted and the reception of the earthquake motion warning information in accordance with the signal transmitted by using the AC carrier in the segment of No. 0. That is to say, the operations which are previously described with reference to FIGS. 7, 11 and 13, respectively, are carried out in the receiving portion 12.

In Step S52, the controller 16 determines whether or not the earthquake motion warning information has been transmitted. For example, either when the early detection flag generated by the receiving portion 12 has been received, or when the earthquake motion warning information generated by the receiving portion 12 has been received, the controller 16 determines that the earthquake motion warning information has been transmitted.

When it is determined in Step S52 that the earthquake motion warning information has not yet been transmitted, the operation returns back to the processing in Step S51, and the reception of only the AC carrier in the segment of No. 0 is continuously carried out.

On the other hand, when it is determined in Step S52 the earthquake motion warning information has been transmitted, in Step S53, the receiving portion 12 receives all 13 segments in accordance with the control made by the controller 16.

The state of the receiving apparatus 1 is switched from the stand-by state over to the ON state, and thus the portions such as the display portion 15 and the speaker 17 are also activated. After activation of the portions, an image of a television program is displayed on the display portion 15, and a sound is outputted from the speaker 17 in accordance with the information transmitted by using the AC carriers in the respective segments other than the segment of No. 0.

The state of the receiving apparatus 1 is switched from the stand-by state over to the ON state in accordance with the situation in which the earthquake motion warning information has been transmitted, and thus the screen display and the like are automatically carried out, thereby making it possible to call the user's attention to the earthquake motion warning information. In addition, the information on the earthquake can be displayed so as to be superimposed on the image of the television program.

<Modification>

Although in the foregoing, the description has been given with respect to the case where the earthquake motion warning information is transmitted by using the AC signal, the same operation may be carried out in the case where warning information other than the earthquake motion warning information is transmitted by using a transmission signal having a predetermined frame structure. For example, information on the weather such as a typhoon, and information on a tsunami wave are contained in the warning information.

As a result, the situation in which the warning information has been transmitted can be detected before the transmission signal having the predetermined frame structure and corresponding to the warning information is received to the last. In addition, the situation in which the warning information has been transmitted can be speedily transmitted to the controller 16.

Figure 16:
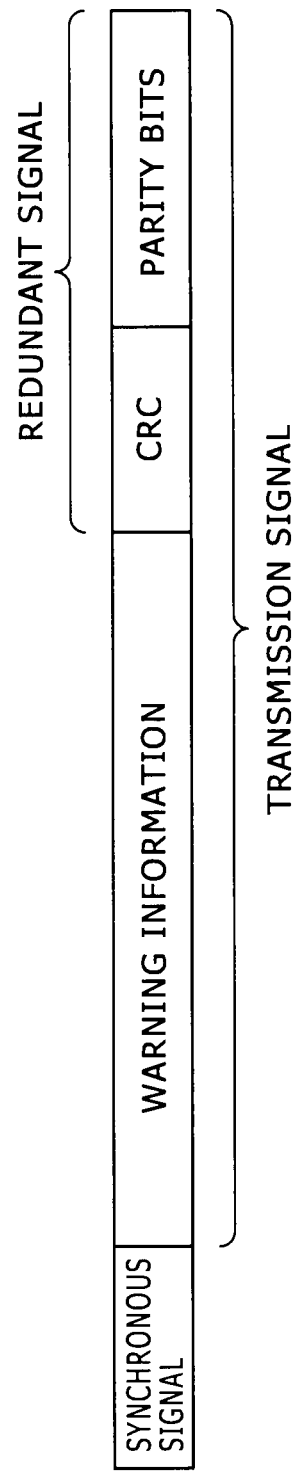
FIG. 16 is a diagram showing a frame structure.

FIG. 16 is a diagram showing an example of the frame structure of the transmission signal with which the warning information is transmitted.

In the example shown in FIG. 16, a synchronous signal is added to the head of the transmission signal. In addition, warning information and a redundant signal are contained in the transmission order in the transmission signal. The redundant signal is composed of a CRC code and parity bits.

Giving a description so as to correspond to the AC signal with which the earthquake motion warning information is transmitted, the synchronous signal shown in FIG. 16 corresponds to the synchronous signal, for the AC signal, detected by the synchronization/frame detecting circuit 38. The warning information shown in FIG. 16 corresponds to the bits from the head to 112nd bit of the AC signal. Also, the CRC code shown in FIG. 16 corresponds to the CRC code of 10 bits contained in the earthquake motion warning information. The parity bits shown in FIG. 16 correspond to the parity bits of 82 bits contained in the earthquake motion warning information.

For example, it is determined whether or not the warning information has been transmitted at a timing at which up to a predetermined number bit of the warning information is received. Also, before the parity bits are received to the last, a flag representing that the warning information has been transmitted is supplied from the receiving portion 12 to the controller 16.

As a result, the controller 16 can speedily detect that the warning information has been transmitted. Thus, a predetermined operation containing processing for informing the user that the warning information has been transmitted, and the like can be started to be carried out.

In addition, processing may also be adopted such that before reception of the parity bits, the CRC is carried out at a timing at which up to the final bit of the CRC code is received, and before the error correction is carried out by using the parity bits, at least a part of the warning information is supplied from the receiving portion 12 to the controller 16.

[Example Applied to Receiving System]

Figure 17:
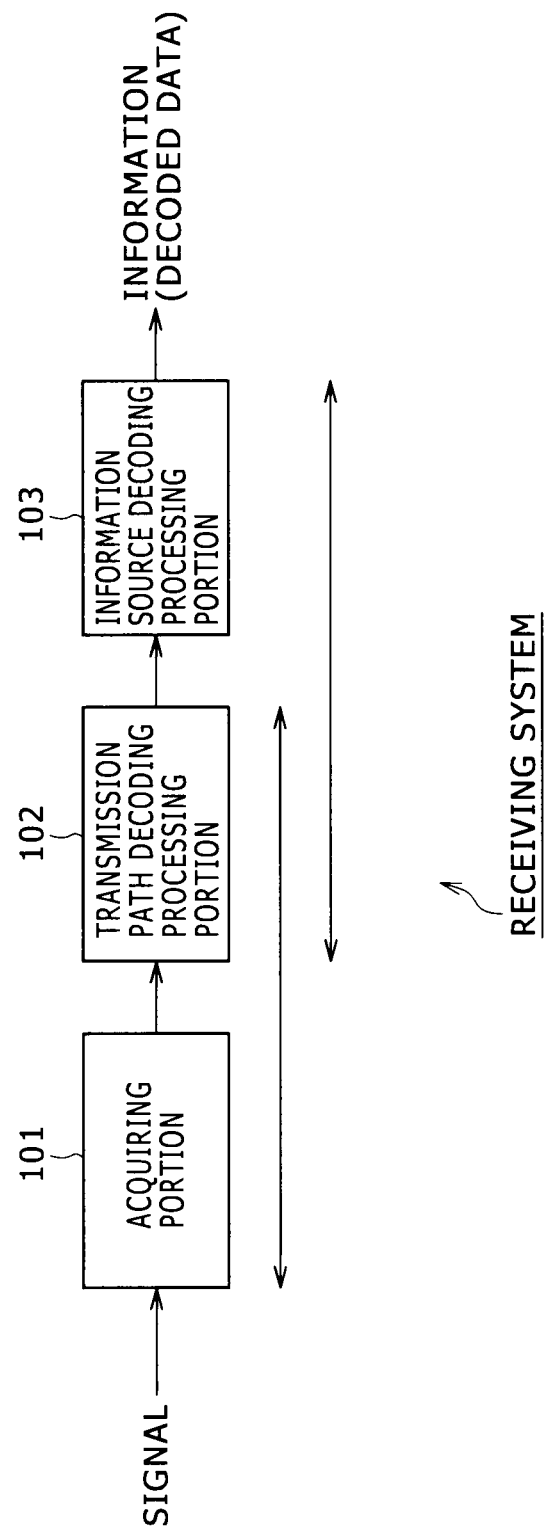
FIG. 17 is a block diagram showing an example of a configuration of a receiving system to which the receiving portion in the receiving apparatus of the first embodiment is applied.

FIG. 17 is a block diagram showing an example of a configuration of a receiving system to which the receiving portion 12 in the receiving apparatus 1 of the first embodiment is applied.

The receiving system shown in FIG. 17 is composed of an acquiring portion 101, a transmission path decoding processing portion 102, and an information source decoding processing 103.

The acquiring portion 101 acquires a signal through a transmission path (not shown) such as a terrestrial digital broadcasting network, a satellite digital broadcasting network, a CATV network, the Internet or any other suitable network, and supplies the signal thus acquired to the transmission path decoding processing portion 102. The receiving portion 12 shown in FIG. 4, for example, is included in the acquiring portion 101.

The transmission path decoding processing portion 102 subjects the signal which the acquiring portion 101 acquires through the transmission path to transmission path decoding processing containing therein the error correction, and supplies the resulting signal to the information source decoding processing 103.

The information source decoding processing 103 subjects the signal obtained through the transmission path decoding processing to information source decoding processing containing therein processing for expanding compressed information into the original information, thereby acquiring data as an object of transmission.

That is to say, the signal which the acquiring portion 101 acquired through the transmission path was subjected to compression coding for compressing information for the purpose of reducing an amount of data such as video data and audio data in some cases. In such cases, the information source decoding processing portion 103 subjects the signal obtained through the transmission path decoding processing to the information source decoding processing such as the processing for expanding compressed information into the original information.

It is noted that when the signal which the acquiring portion 101 acquired through the transmission path was not subjected to the compression coding, the information source decoding processing portion 103 does not execute the processing for expanding the compressed information into the original information. Here, for example, the MPEG decode or the like is known as the expanding processing. In addition, in addition to the expanding processing, descramble processing and the like are contained in the information source decoding processing in some cases.

The receiving system shown in FIG. 17, for example, can be applied to a television tuner or the like for receiving a digital television broadcasting. It is noted that the acquiring portion 101, the transmission path decoding processing portion 102, and the information source decoding processing portion 103 can be configured in the form of respective independent units (such as hardware (Integrated Circuit (IC)) or software modules).

In addition, the acquiring portion 101, the transmission path decoding processing portion 102, and the information source decoding processing portion 103 as three sets can also be configured in the form of one independent unit. A set of acquiring portion 101 and transmission path decoding processing portion 102 can also be configured in the form of one independent unit, or a set of transmission path decoding processing portion 102 and information source decoding processing portion 103 can also be configured in the form of one independent unit.

Figure 18:
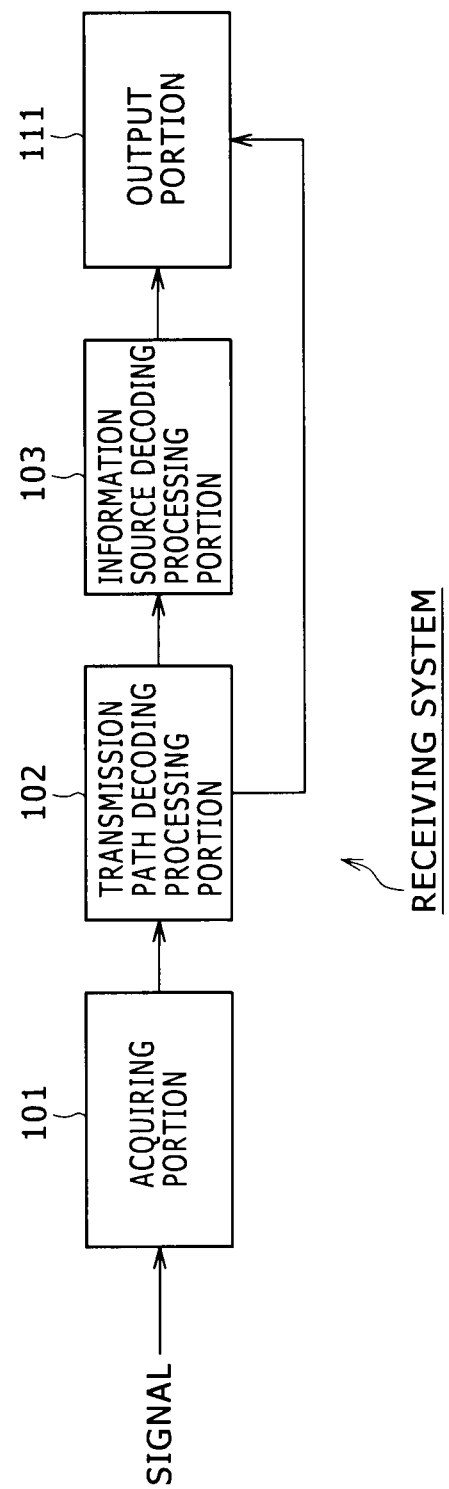
FIG. 18 is a block diagram showing an example of a configuration of a receiving system to which the receiving portion in the receiving apparatus of the second embodiment is applied.

FIG. 18 is a block diagram showing an example of a configuration of a receiving system to which the receiving portion 12 in the receiving apparatus 1 of the second embodiment is applied.

Of the constituent elements shown in FIG. 18, the constituent elements corresponding to those shown in FIG. 17 are designated by the reference numerals, respectively, and a description thereof is suitably omitted here for the sake of simplicity.

A configuration of the receiving system shown in FIG. 18 is identical to that of the receiving system shown in FIG. 17 in that the receiving system has the acquiring portion 101, the transmission path decoding processing portion 102, and the information source decoding processing portion 103, and is different from that of the receiving system shown in FIG. 17 in that an output portion 111 is newly provided.

The output portion 111, for example, is composed of a display device for displaying thereon an image, or a speaker for outputting a sound, and outputs an image, a sound or the like based on a signal outputted from the information source decoding processing portion 103. That is to say, the output portion 111 either displays an image or outputs a sound.

The receiving system shown in FIG. 18, for example, can be applied to a TV for receiving a television broadcasting as a digital broadcasting, a radio receiver for receiving a radio broadcasting, or the like.

It is noted that when the signal acquired in the acquiring portion 101 was not subjected to the compression coding, the signal which the transmission path decoding processing portion 102 outputs is directly supplied to the output portion 111.

Figure 19:
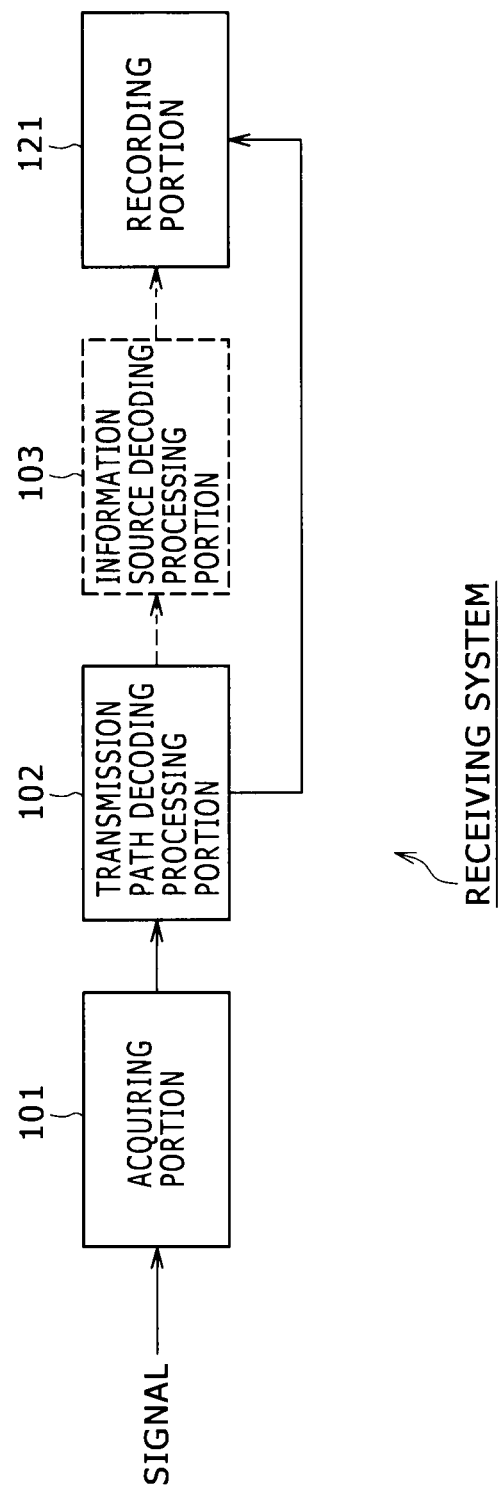
FIG. 19 is a block diagram showing an example of a configuration of a receiving system to which the receiving portion in the receiving apparatus of the third embodiment is applied.

FIG. 19 is a block diagram showing an example of a configuration of a receiving system to which the receiving portion 12 in the receiving apparatus 1 of the third embodiment is applied.

Of the constituent elements shown in FIG. 19, the constituent elements corresponding to those shown in FIG. 17 are designated by the reference numerals, respectively, and a description thereof is suitably omitted here for the sake of simplicity.

A configuration of the receiving system shown in FIG. 19 is identical to that of the receiving system shown in FIG. 17 in that the receiving system has the acquiring portion 101 and the transmission path decoding processing portion 102, and is different from that of the receiving system shown in FIG. 17 in that the information source decoding processing portion 103 is not provided, but is a recording portion 121 is newly provided.

The recording portion 121 records (causes) the signal (such as a TS packet of TS of MPEG) outputted from the transmission path decoding processing portion 102 (to be recorded) in a recording (storage) media such as an optical disc, a hard disk (magnetic disk) or a flash memory.

The receiving system of FIG. 19 as described above can be applied to a recorder apparatus or the like for recording a television broadcasting.

It is noted that the information source decoding processing portion 103 may be provided, and a signal obtained through the information source decoding processing in the information source decoding processing portion 103, that is, video data or audio data obtained through the decode may be recorded in the recording portion 121.

The series of processing described above can be executed by the software as well as by the hardware. When a series of processing is executed by the software, a program composing that software is installed from a program recording media to a computer incorporated in dedicated hardware, a general-purpose personal computer or the like.

Figure 20:
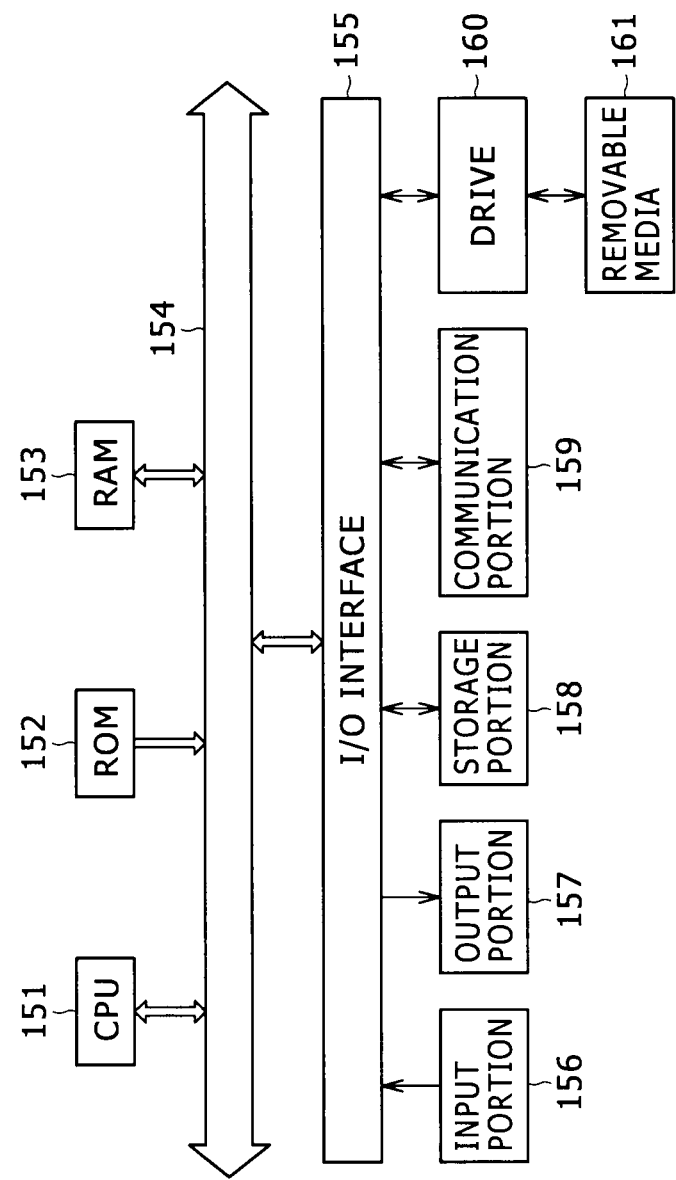
FIG. 20 is a block diagram showing a configuration of hardware of a computer according to an embodiment of the present invention.

FIG. 20 is a block diagram showing a configuration of hardware of a computer for executing the series of processing described above in accordance with a program according to an embodiment of the present invention.

A Central Processing Unit (CPU) 151, a Read Only Memory (ROM) 152, and a Random Access Memory (RAM) 153 are connected to one another through a bus 154.

An I/O interface 155 is further connected to the bus 154. An input portion 156 composed of a keyboard, a mouse or the like, and an output portion 157 composed of a display device, a speaker or the like are connected to the I/O interface 155. In addition, a storage portion 158 composed of a hard disk, a nonvolatile memory or the like, a communication portion 159 composed of a network interface or the like, and a drive 160 for driving a removable media 161 are all connected to the I/O interface 155.

With the computer configured as described above, the CPU 151 loads the program, for example, stored in the storage portion 158 into the RAM 153 through the I/O interface 155 and the bus 154, and then executes the program thus loaded, thereby executing the series of processing described above.

The program which is executed by the CPU 151, for example, either is recorded in the removable media 161, or is presented through a wired or wireless transmission media such as a Local Area Network (LAN), the Internet, or a digital broadcasting network to be installed in the storage portion 158.

It is noted that the program which is executed by the computer either may be a program in accordance with which the processing is executed in a time series manner along the order described in this specification, or may be a program in accordance with which the processing is executed in parallel at a necessary timing such as at a timing when a call is made.

The embodiments of the present invention are by no means limited to the embodiments described above, and various kinds of changes can be made without departing from the subject matter of the present invention.

The present application contains subject matter related to that disclosed in Japanese Priority Patent Application JP 2010-032125 filed in the Japan Patent Office on Feb. 17, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An information receiving apparatus comprising:
   circuitry configured to
   receive an alert signal comprising a predetermined number of bits;
   detect that the alert signal includes alert information by processing a 3 bit structure identification field of the alert signal, a 13 synchronization field of the alert signal, a 2 bit start/ending flag field of the alert signal, a 2 bit update flag field of the alert signal, and a 3 bit signal identification field of the alert signal; and
   output an indication corresponding to the detection.

2. The information receiving apparatus of claim 1, wherein the alert signal comprises 204 bits.

3. The information receiving apparatus of claim 1, wherein the circuitry is configured to:
   process all of the predetermined number of bits of the alert signal; and
   output data corresponding to an emergency event based on the processing.

4. The information receiving apparatus of claim 1, wherein the alert signal comprises redundant information.

5. The information receiving apparatus of claim 4, wherein the redundant information comprises a plurality of cyclic redundancy check (CRC) bits and a plurality of parity bits.

6. The information receiving apparatus of claim 4, wherein the alert signal comprises warning information.

7. The information receiving apparatus of claim 6, wherein the warning information is provided in the alert signal before the redundant information.

8. The information receiving apparatus of claim 1, wherein the alert signal is an Integrated Services Digital Broadcasting-Terrestrial (ISDB-T) compliant signal.

9. The information receiving apparatus of claim 1, wherein the circuitry is configured to:
   generate an early detection flag; and
   write the early detection flag to a register when it is determined that the alert signal includes alert information.

10. The information receiving apparatus of claim 9, wherein the circuitry is configured to process all of the predetermined number of bits of the alert signal after the early detection flag is written to the register by the early detection flag generating circuit.

11. A method of processing an alert signal by a receiving apparatus, the method comprising:
    receiving, by a receiver of the receiving apparatus, the alert signal comprising a predetermined number of bits;
    detecting, by a circuitry of the receiving apparatus, that the alert signal includes alert information by processing a 3 bit structure identification field of the alert signal, a 13 bit synchronization field of the alert signal, a 2 bit start/ending flag field of the alert signal, a 2 bit update flag field of the alert signal, and a 3 signal identification field of the alert signal; and
    outputting, by the circuitry, an indication corresponding to the detection.

12. A non-transitory computer-readable medium including a computer program, which when executed by a receiving apparatus, causes the receiving apparatus to:
    receiving an alert signal comprising a predetermined number of bits;
    detecting that the alert signal includes alert information by processing a 3 bit structure identification field of the alert signal, a 13 bit synchronization field of the alert signal, a 2 bit start/ending flag field of the alert signal, a 2 bit update flag field of the alert signal, and a 3 bit signal identification field of the alert signal; and
    outputting an indication corresponding to the detection.

* * * * *